(12) United States Patent
Hunter et al.

(10) Patent No.: US 10,822,076 B2
(45) Date of Patent: Nov. 3, 2020

(54) DUAL ROTOR, ROTARY WING AIRCRAFT

(71) Applicant: SIKORSKY AIRCRAFT CORPORATION, Stratford, CT (US)

(72) Inventors: David H. Hunter, Cheshire, CT (US); Justin Thomas, New Haven, CT (US); Robert D. Beatty, Stratford, CT (US); Nicholas Charles Tuozzo, Hamden, CT (US); Thomas Alan Egolf, Stratford, CT (US); Peter F. Lorber, Southbury, CT (US); Robert C. Moffitt, Seymour, CT (US); Shawn Westfall, Stratford, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 355 days.

(21) Appl. No.: 15/510,553

(22) PCT Filed: Sep. 30, 2015

(86) PCT No.: PCT/US2015/053223
§ 371 (c)(1),
(2) Date: Mar. 10, 2017

(87) PCT Pub. No.: WO2016/054209
PCT Pub. Date: Apr. 7, 2016

(65) Prior Publication Data
US 2017/0291699 A1    Oct. 12, 2017

Related U.S. Application Data

(60) Provisional application No. 62/058,152, filed on Oct. 1, 2014, provisional application No. 62/058,424, filed on Oct. 1, 2014.

(51) Int. Cl.
*B64C 27/467*    (2006.01)
*B64C 27/46*    (2006.01)
(Continued)

(52) U.S. Cl.
CPC ............... *B64C 27/10* (2013.01); *B64C 27/12* (2013.01); *B64C 27/14* (2013.01); *B64C 27/463* (2013.01);
(Continued)

(58) Field of Classification Search
CPC ...... B64C 27/46; B64C 27/463; B64C 27/467; B64C 27/473
See application file for complete search history.

(56) References Cited

U.S. PATENT DOCUMENTS

| 1,344,486 A | 6/1920 | Coffelt |
| 2,344,967 A | 3/1944 | Bennett |

(Continued)

FOREIGN PATENT DOCUMENTS

| EP | 2431273 A2 | 3/2012 |
| EP | 2719619 A2 | 4/2014 |

(Continued)

OTHER PUBLICATIONS

Notification of Transmittal of the International Search Report for International Application No. PCT/US2015/036364 dated Jan. 6, 201; dated Jan. 29, 2016; 13 pages.

(Continued)

*Primary Examiner* — Nicholas McFall
*Assistant Examiner* — Terri L Filosi
(74) *Attorney, Agent, or Firm* — Baker Botts L.L.P.

(57) ABSTRACT

A main rotor blade assembly for a rotary wing aircraft is provided including a main rotor blade root region, a main rotor blade inboard region arranged outboard of said main rotor blade root region, a main rotor blade main region arranged outboard of said main rotor blade inboard region, and a main rotor blade tip region arranged outboard of said main rotor blade main region. At least one of chord, twist, sweep, airfoil shape, and thickness/chord of the main rotor (Continued)

blade assembly has been optimized to achieve balanced high speed forward flight and hover relative to both efficiency and high thrust capability.

12 Claims, 16 Drawing Sheets

(51) Int. Cl.
    *B64C 27/473*     (2006.01)
    *B64C 27/10*     (2006.01)
    *B64C 27/14*     (2006.01)
    *B64C 27/12*     (2006.01)
    *G05D 1/08*     (2006.01)
    *B64C 27/82*     (2006.01)

(52) U.S. Cl.
    CPC .......... *B64C 27/467* (2013.01); *B64C 27/473* (2013.01); *G05D 1/0858* (2013.01); *B64C 2027/8236* (2013.01); *B64C 2027/8272* (2013.01); *B64C 2027/8281* (2013.01)

(56) References Cited

U.S. PATENT DOCUMENTS

| | | | |
|---|---|---|---|
| 2,350,962 A | 6/1944 | Hays |
| 2,482,460 A | 9/1949 | Browne |
| 2,557,127 A | 6/1951 | Magill |
| 2,582,609 A | 1/1952 | Steele |
| 2,665,859 A | 1/1954 | James |
| 2,698,147 A | 12/1954 | Hovgard |
| 2,967,684 A | 1/1961 | Knecht |
| 2,980,186 A | 4/1961 | Strong et al. |
| 3,002,420 A | 10/1961 | Willits et al. |
| 3,029,048 A | 4/1962 | Earnest et al. |
| 3,217,811 A | 11/1965 | Hibyan et al. |
| 3,310,120 A | 3/1967 | Vacca |
| 3,327,969 A | 6/1967 | Head |
| 3,332,643 A | 7/1967 | Toner |
| 3,409,249 A | 11/1968 | Bergquist et al. |
| 3,421,717 A | 1/1969 | Di Piro |
| 3,521,971 A | 7/1970 | Cheney, Jr. |
| 3,570,786 A | 3/1971 | Lewis |
| 3,591,109 A | 7/1971 | McLarty |
| 3,599,907 A | 8/1971 | Ransom et al. |
| 3,822,105 A | 7/1974 | Jepson |
| 4,008,979 A | 2/1977 | Cooper et al. |
| 4,020,324 A | 4/1977 | Buscher et al. |
| 4,114,843 A | 9/1978 | Robinson |
| 4,142,837 A | 3/1979 | De Simone |
| 4,168,045 A | 9/1979 | Wright et al. |
| 4,248,572 A | 2/1981 | Fradenburgh |
| 4,304,375 A | 12/1981 | Builta et al. |
| 4,332,525 A | 6/1982 | Cheney, Jr. |
| 4,334,828 A | 6/1982 | Moffitt |
| 4,375,940 A | 3/1983 | Lovera et al. |
| 4,386,848 A | 6/1983 | Clendenin et al. |
| 4,392,781 A | 7/1983 | Mouille et al. |
| 4,531,692 A | 7/1985 | Mateus |
| 4,540,144 A | 9/1985 | Perrella |
| 4,573,873 A | 3/1986 | Yao et al. |
| 4,583,626 A | 4/1986 | Spridco |
| 4,681,511 A | 7/1987 | Glatfelter |
| 4,704,070 A | 11/1987 | Iseman |
| 4,730,795 A | 3/1988 | David |
| 4,825,375 A | 4/1989 | Nadkarni et al. |
| 4,856,483 A | 8/1989 | Beavis et al. |
| 5,005,439 A | 4/1991 | Jensen et al. |
| 5,058,824 A | 10/1991 | Cycon et al. |
| 5,213,283 A | 5/1993 | Gold et al. |
| 5,219,143 A | 6/1993 | Staple et al. |
| 5,222,691 A | 6/1993 | Gold et al. |
| 5,238,203 A | 8/1993 | Skonieczny et al. |
| 5,240,204 A | 8/1993 | Kunz |
| 5,253,979 A | 10/1993 | Fradenburgh et al. |
| 5,393,015 A | 2/1995 | Piasecki |
| 5,427,336 A | 6/1995 | Haggerty et al. |
| 5,454,530 A | 10/1995 | Rutherford et al. |
| 5,527,004 A | 6/1996 | Haggerty et al. |
| 5,614,908 A | 3/1997 | Phelan et al. |
| 5,845,236 A | 12/1998 | Jolly et al. |
| 5,914,691 A | 6/1999 | Mandai et al. |
| 6,086,016 A | 7/2000 | Meek |
| 6,086,975 A | 7/2000 | Brick et al. |
| 6,098,921 A | 8/2000 | Piasecki |
| 6,198,991 B1 | 3/2001 | Yamakawa et al. |
| 6,322,324 B1 | 11/2001 | Kennedy et al. |
| 6,448,924 B1 | 9/2002 | Hafer, Jr. |
| 6,460,802 B1 | 10/2002 | Norris |
| 6,467,726 B1 | 10/2002 | Hosoda |
| 6,497,385 B1 | 12/2002 | Wachspress et al. |
| 6,533,549 B1 | 3/2003 | Schreiber et al. |
| 6,592,071 B2 | 7/2003 | Kinkead et al. |
| 6,598,830 B1 | 7/2003 | Ambrose et al. |
| 6,641,365 B2 | 11/2003 | Karem |
| 6,655,631 B2 | 12/2003 | Brown |
| 6,793,173 B2 | 9/2004 | Salesse-Lavergne |
| 6,885,917 B2 | 4/2005 | Osder et al. |
| 6,886,777 B2 | 5/2005 | Rock |
| 6,905,091 B2 | 6/2005 | Berson et al. |
| 6,929,215 B2 | 8/2005 | Arlton |
| 7,017,857 B2 | 3/2006 | Hill et al. |
| 7,198,223 B2 | 4/2007 | Phelps, III et al. |
| 7,210,651 B2 | 5/2007 | Scott |
| 7,229,251 B2 | 6/2007 | Bertolotti et al. |
| 7,264,199 B2 | 9/2007 | Zientek |
| 7,296,767 B2 | 11/2007 | Palcic et al. |
| 7,413,142 B2 | 8/2008 | Gmirya |
| 7,434,764 B2 | 10/2008 | Lappos et al. |
| 7,438,259 B1 | 10/2008 | Piasecki et al. |
| 7,440,825 B2 | 10/2008 | Einthoven et al. |
| 7,451,949 B2 | 11/2008 | Eglin |
| 7,461,819 B2 | 12/2008 | Eglin |
| 7,471,057 B2 | 12/2008 | Clary |
| 7,513,750 B2 | 4/2009 | Moffitt et al. |
| 7,530,787 B2 | 5/2009 | Bertolotti et al. |
| 7,530,790 B2 | 5/2009 | Cabrera et al. |
| 7,582,032 B2 | 9/2009 | Manfredotti et al. |
| 7,584,923 B2 | 9/2009 | Burrage |
| 7,600,976 B2 | 10/2009 | Bagai et al. |
| 7,604,198 B2 | 10/2009 | Petersen |
| 7,621,480 B2 | 11/2009 | Darrow, Jr. et al. |
| 7,628,355 B2 | 12/2009 | Palcic et al. |
| 7,648,338 B1 | 1/2010 | Welsh |
| 7,674,091 B2 | 3/2010 | Zierten |
| 7,758,310 B2 | 7/2010 | Cotton et al. |
| 7,823,827 B2 | 11/2010 | Piasecki et al. |
| 7,836,701 B2 | 11/2010 | Zack et al. |
| 7,841,829 B2 | 11/2010 | Schmaling et al. |
| 7,857,252 B2 | 12/2010 | Walliser et al. |
| 7,857,598 B2 | 12/2010 | McGeer et al. |
| 7,874,526 B2 | 1/2011 | Boczar et al. |
| 7,908,044 B2 | 3/2011 | Piasecki et al. |
| 7,930,074 B2 | 4/2011 | Cherepinsky et al. |
| 7,942,365 B2 | 5/2011 | Palcic et al. |
| 7,967,239 B2 | 6/2011 | Cotton et al. |
| 8,019,490 B2 | 9/2011 | Ferren et al. |
| 8,036,821 B2 | 10/2011 | Cornett et al. |
| 8,052,094 B2 | 11/2011 | Roesch |
| 8,052,097 B2 | 11/2011 | Rollet |
| 8,074,925 B2 | 12/2011 | Morgan et al. |
| 8,113,460 B2 | 2/2012 | Roesch |
| 8,167,233 B2 | 5/2012 | Brody et al. |
| 8,170,728 B2 | 5/2012 | Roesch |
| 8,181,901 B2 | 5/2012 | Roesch |
| 8,201,772 B2 | 6/2012 | Wendelsdorf et al. |
| 8,303,248 B2 | 11/2012 | Cabrera et al. |
| 8,376,264 B1 | 2/2013 | Hong et al. |
| 8,382,028 B2 | 2/2013 | Jolly |
| 8,390,516 B2 | 3/2013 | Parsche |
| 8,403,255 B2 | 3/2013 | Piasecki |
| 8,435,002 B2 | 5/2013 | Jolly et al. |
| 8,473,124 B2 | 6/2013 | Shue et al. |

(56) References Cited

U.S. PATENT DOCUMENTS

| | | |
|---|---|---|
| 8,473,125 B2 | 6/2013 | Rischmuller et al. |
| 8,534,596 B2 | 9/2013 | Lauder |
| 8,548,648 B2 | 10/2013 | Sahasrabudhe et al. |
| 8,548,780 B2 | 10/2013 | Skelly et al. |
| 8,568,096 B2 | 10/2013 | Eglin |
| 8,583,295 B2 | 11/2013 | Eglin et al. |
| 8,590,827 B2 | 11/2013 | Sparks |
| 8,613,686 B2 | 12/2013 | Stille |
| 8,640,985 B2 | 2/2014 | Brunken, Jr. |
| 8,686,918 B1 | 4/2014 | Diaz |
| 8,702,377 B2 | 4/2014 | Cottrell et al. |
| 8,746,649 B2 | 6/2014 | Haynes et al. |
| 8,763,949 B2 | 7/2014 | Thomassey |
| 8,788,123 B2 | 7/2014 | Salesse-Lavergne et al. |
| 8,801,380 B2 | 8/2014 | Stille |
| 8,812,177 B2 | 8/2014 | Yates et al. |
| 8,827,204 B2 | 9/2014 | Long et al. |
| 8,844,880 B1 | 9/2014 | Corliss |
| 8,864,062 B2 | 10/2014 | Karem |
| 8,882,025 B2 | 11/2014 | Lauder |
| 8,920,125 B2 | 12/2014 | Welsh |
| 8,979,495 B2 | 3/2015 | D'Anna |
| 9,026,277 B2 | 5/2015 | Fang et al. |
| 9,046,148 B2 | 6/2015 | Welsh |
| 9,073,627 B2 | 7/2015 | Jolly et al. |
| 9,079,659 B2 | 7/2015 | Van Der Westhuizen et al. |
| 9,085,352 B2 | 7/2015 | Egli |
| 9,102,400 B2 | 8/2015 | Cherepinsky |
| 9,120,567 B2 | 9/2015 | Scott et al. |
| 9,242,723 B2 | 1/2016 | Wildschek |
| 10,086,932 B2 | 10/2018 | Eller et al. |
| 2002/0005455 A1 | 1/2002 | Carter, Jr. |
| 2002/0088898 A1 | 7/2002 | Lucy |
| 2002/0117579 A1 | 8/2002 | Kotoulas et al. |
| 2003/0057331 A1 | 3/2003 | Kinkead et al. |
| 2004/0007644 A1 | 1/2004 | Phelps, III et al. |
| 2004/0050999 A1 | 3/2004 | Hill et al. |
| 2005/0067527 A1 | 3/2005 | Petersen |
| 2005/0127238 A1 | 6/2005 | Ballew |
| 2005/0151001 A1 | 7/2005 | Loper |
| 2005/0236518 A1 | 10/2005 | Scott |
| 2006/0011777 A1 | 1/2006 | Arlton et al. |
| 2006/0027100 A1 | 2/2006 | Kozyuk |
| 2006/0054737 A1 | 3/2006 | Richardson |
| 2006/0231677 A1 | 10/2006 | Zimet et al. |
| 2006/0266153 A1 | 11/2006 | Clary |
| 2006/0269411 A1 | 11/2006 | Bertolotti et al. |
| 2006/0269413 A1 | 11/2006 | Cotton et al. |
| 2006/0269418 A1 | 11/2006 | Bagai et al. |
| 2007/0084963 A1 | 4/2007 | Nouhaud |
| 2007/0110582 A1 | 5/2007 | Bagai et al. |
| 2007/0118254 A1 | 5/2007 | Barnes et al. |
| 2007/0166163 A1 | 7/2007 | Bertolotti et al. |
| 2007/0181741 A1 | 8/2007 | Darrow, Jr. et al. |
| 2007/0187549 A1 | 8/2007 | Owen |
| 2007/0262197 A1 | 11/2007 | Phelps, III et al. |
| 2008/0112808 A1 | 5/2008 | Schmaling et al. |
| 2008/0169379 A1 | 7/2008 | Cotton et al. |
| 2008/0234881 A1 | 9/2008 | Cherepinsky et al. |
| 2008/0237392 A1 | 10/2008 | Piasecki et al. |
| 2008/0249672 A1 | 10/2008 | Cherepinsky |
| 2008/0253891 A1 | 10/2008 | Cabrera et al. |
| 2009/0159740 A1 | 6/2009 | Brody et al. |
| 2009/0266078 A1 | 10/2009 | Murray |
| 2009/0304511 A1 | 12/2009 | Brannon, III |
| 2010/0003133 A1 | 1/2010 | Welsh |
| 2010/0006697 A1 | 1/2010 | Horinouchi |
| 2010/0012769 A1 | 1/2010 | Alber et al. |
| 2010/0044499 A1 | 2/2010 | Dragan et al. |
| 2010/0047067 A1 | 2/2010 | Houser et al. |
| 2010/0083631 A1 | 4/2010 | Foster et al. |
| 2010/0224720 A1 | 9/2010 | Roesch |
| 2010/0254817 A1 | 10/2010 | Agnihotri et al. |
| 2011/0010936 A1 | 1/2011 | Owen |
| 2011/0024555 A1 | 2/2011 | Kuhn, Jr. |
| 2011/0036954 A1 | 2/2011 | Piasecki |
| 2011/0057071 A1 | 3/2011 | Sahasrabudhe et al. |
| 2011/0144815 A1 | 6/2011 | Neumann |
| 2011/0272519 A1 | 11/2011 | Challis |
| 2012/0034080 A1 | 2/2012 | Agrawal et al. |
| 2012/0072056 A1 | 3/2012 | Hasan et al. |
| 2012/0111417 A1 | 5/2012 | Smith et al. |
| 2012/0119023 A1 | 5/2012 | Moore et al. |
| 2012/0141273 A1 | 6/2012 | Jolly et al. |
| 2012/0156033 A1 | 6/2012 | Cowles |
| 2012/0168556 A1 | 7/2012 | Sonneborn |
| 2012/0175461 A1 | 7/2012 | Van Der Westhuizen et al. |
| 2012/0181379 A1 | 7/2012 | Eller et al. |
| 2012/0280857 A1 | 11/2012 | Elder |
| 2013/0011260 A1 | 1/2013 | Yoshizaki et al. |
| 2013/0181087 A1 | 7/2013 | Long et al. |
| 2013/0214087 A1 | 8/2013 | Corrigan et al. |
| 2013/0233977 A1 | 9/2013 | Smiley et al. |
| 2013/0264412 A1 | 10/2013 | Dyrla |
| 2013/0265185 A1 | 10/2013 | Kreitmair-Steck et al. |
| 2013/0274061 A1 | 10/2013 | Stille |
| 2013/0334360 A1 | 12/2013 | Norem et al. |
| 2014/0023499 A1 | 1/2014 | Collingbourne |
| 2014/0030103 A1 | 1/2014 | Matalanis et al. |
| 2014/0034774 A1 | 2/2014 | Ferrier et al. |
| 2014/0061367 A1 | 3/2014 | Fink et al. |
| 2014/0009650 A1 | 4/2014 | Pantalone, III et al. |
| 2014/0091172 A1 | 4/2014 | Arlton |
| 2014/0095001 A1 | 4/2014 | Cherepinsky |
| 2014/0138492 A1 | 5/2014 | Van Staagen |
| 2014/0145025 A1 | 5/2014 | Fang et al. |
| 2014/0154084 A1 | 6/2014 | Alber |
| 2014/0191079 A1 | 7/2014 | Ehinger et al. |
| 2014/0271182 A1 | 9/2014 | Shundo et al. |
| 2014/0271222 A1 | 9/2014 | Maresh |
| 2014/0299709 A1 | 10/2014 | D'Anna |
| 2014/0314563 A1 | 10/2014 | Mayrides et al. |
| 2014/0314573 A1 | 10/2014 | Mayrides et al. |
| 2015/0028152 A1 | 1/2015 | Eller et al. |
| 2015/0028597 A1 | 1/2015 | Eller et al. |
| 2015/0050142 A1 | 2/2015 | Knag et al. |
| 2015/0053815 A1 | 2/2015 | Litwinowicz et al. |
| 2015/0100184 A1 | 4/2015 | Nathan et al. |
| 2015/0166175 A1 | 6/2015 | Prud'Homme-Lacroix et al. |
| 2015/0198436 A1 | 7/2015 | Cotton |
| 2015/0203196 A1 | 7/2015 | Heverly, II et al. |
| 2015/0210381 A1 | 7/2015 | Greenfield et al. |
| 2015/0217863 A1 | 8/2015 | Modrzejewski et al. |
| 2015/0225053 A1 | 8/2015 | Perkinson |
| 2017/0210463 A1 | 7/2017 | Koessick et al. |
| 2017/0217581 A1 | 8/2017 | Hunter et al. |
| 2017/0225797 A1 | 8/2017 | Bredenbeck et al. |
| 2017/0283046 A1 | 10/2017 | Egolf et al. |
| 2017/0283049 A1 | 10/2017 | Weiner |
| 2017/0305539 A1 | 10/2017 | Alber et al. |
| 2018/0050795 A1 | 2/2018 | Geiger et al. |
| 2018/0148165 A1 | 5/2018 | Geiger et al. |

FOREIGN PATENT DOCUMENTS

| | | |
|---|---|---|
| EP | 2719619 A3 | 4/2014 |
| EP | 2727832 A1 | 5/2014 |
| GB | 631165 A | 10/1949 |
| GB | 850037 A | 9/1960 |
| WO | 03091099 A2 | 11/2003 |
| WO | 2009085639 A1 | 7/2009 |
| WO | 2011134473 A1 | 11/2011 |
| WO | 2015024044 A1 | 8/2013 |
| WO | 2014045276 A1 | 3/2014 |
| WO | 2015061857 A1 | 5/2015 |
| WO | 2015152910 A1 | 10/2015 |

OTHER PUBLICATIONS

Notification of Transmittal of the International Search Report for International Application No. PCT/US2015/040356 dated Sep. 11, 2015; dated Oct. 1, 2015; 7 pages.

(56) References Cited

OTHER PUBLICATIONS

Notification of Transmittal of the International Search Report for International Application No. PCT/US2015/042219 dated Sep. 30, 2015; dated Jan. 12, 2016; 8 pages.
Notification of Transmittal of the International Search Report for International Application No. PCT/US2015/044005 dated Oct. 6, 2015; dated Nov. 6, 2015; 9 pages.
Notification of Transmittal of the International Search Report for International Application No. PCT/US2015/052123 dated Nov. 15, 2015; dated Dec. 17, 2015; 10 pages.
Notification of Transmittal of the International Search Report for International Application No. PCT/US2015/052549 dated Nov. 14, 2015; dated Dec. 15, 2015; 7 pages.
Notification of Transmittal of the International Search Report for International Application No. PCT/US2015/052783 dated Nov. 10, 2015; dated Dec. 17, 2015; 6 pages.
Notification of Transmittal of the International Search Report for International Application No. PCT/US2015/053070 dated Nov. 30, 2015; dated Dec. 29, 2015; 15 pages.
Notification of Transmittal of the International Search Report for International Application No. PCT/US2015/053095 dated Feb. 5, 2016; dated Feb. 23, 2016; 4 pages.
Notification of Transmittal of the International Search Report for International Application No. PCT/US2015/051901 dated Sep. 24, 2015; dated Feb. 12, 2016; 7 pages.
Notification of Transmittal of the International Search Report for International Application No. PCT/US2015/052142 dated Mar. 21, 2016; dated Apr. 8, 2016; 5 pages; 12 pages.
Notification of Transmittal of the International Search Report for International Application No. PCT/US2015/53091 dated Sep. 30, 2015; dated Feb. 10, 2016; 10 pages.
PCT Notification of Transmittal of the International Search Report for International Application No. PCT/US2015/052547 dated Sep. 28, 2015; dated Apr. 19, 2016; 8 pages.
Written Opinion of the International Searching Authority for International Application No. PCT/US2015/036364 dated Jan. 6, 201; dated Jan. 29, 2016; 4 pages.
Written Opinion of the International Searching Authority for International Application No. PCT/US2015/040356 dated Sep. 11, 2015; dated Oct. 1, 2015; 6 pages.
Written Opinion of the International Searching Authority for International Application No. PCT/US2015/042219 dated Sep. 30, 2015; dated Jan. 12, 2016; 6 pages.
Written Opinion of the International Searching Authority for International Application No. PCT/US2015/044005 dated Oct. 6, 2015; dated Nov. 6, 2015; 6 pages.
Written Opinion of the International Searching Authority for International Application No. PCT/US2015/051901 dated Sep. 24, 2015; dated Feb. 12, 2016; 5 pages.
Written Opinion of the international Searching Authority for International Application No. PCT/US2015/052123 dated Nov. 15, 2015; dated Dec. 17, 2015; 4 pages.
Written Opinion of the International Searching Authority for International Application No. PCT/US2015/052142 dated Mar. 21, 2016; dated Apr. 8, 2016; 5 pages.
Written Opinion of the International Searching Authority for International Application No. PCT/US2015/052547 dated Sep. 28, 2015; dated Apr. 19, 2016; 5 pages.
Written Opinion of the International Searching Authority for International Application No. PCT/US2015/052549 dated Nov. 14, 2015; dated Dec. 15, 2015; 5 pages.
Written Opinion of the International Searching Authority for International Application No. PCT/US2015/052783 dated Nov. 10, 2015; dated Dec. 17, 2015; 4 pages.
Written Opinion of the International Searching Authority for International Application No. PCT/US2015/053070 dated Nov. 30, 2015; dated Dec. 29, 2015; 4 pages.
Written Opinion of the International Searching Authority for International Application No. PCT/US2015/053095 dated Feb. 5, 2016; dated Feb. 23, 2016; 5 pages.
Written Opinion of the International Searching Authority for International Application No. PCT/US2015/53091 dated Sep. 30, 2015; dated Feb. 10, 2016; 7 pages.
(CNET) "Sikorsky S-97 Helicopter Shoots for Speed with Unusual Design" Oct. 3, 2014; 7 pages.
Bagai, Ashish, "Aerodynamic Design of the X2 Technology Demonstrator TM Main Rotor Blade", Sikorsky Aircraft Corporation, Apr. 2008, pp. 1-16.
Cantreii, Paul; "Semi-Rigid Main Rotors;" Web Article; Helicopter Aviation; Apr. 28, 2015; 7 Pages; http://www.copters.com/mech/mr_semi.html.
Cavalry Pilot; "Chapter 2 Fundamentals of Rotors;" FM 1-514 Chptr 2—Fundamentals of Rotors; Apr. 28, 2015; 10 Pages; http://www.cavalrypilot.com/fm1-514/Ch2.htm.
Felker, Fort F. III, "Performance and Loads Data from a Wind Tunnel Test of a Full-Scale, Coaxial, Hingless Rotor Helicopter", NASA Technical Memorandum, Oct. 1981, pp. 1-346.
Giovanetti et al., "Optimum Design of Compound Helicopters that Use Higher Harmonic Control"; Duke University, Durham, North Carolina 27708; Journal of Aircraft; downloaded Aug. 24, 2015 | http://arc.aiaa.org | DOI: 10.2514/1.C032941; 10 pages.
H-92 Superhawk Multi-Mission Helicopter. AirForce-Technology.com, Aug. 30, 2014; retrieved online: <https://web.archive.org/web/20140830025048/http://aitforce-technology.com/projects/superhawk/>; pp. 2-4.
http://www.hightech-edge.com/kikorsky-x2-raider-s-97-high-speed-military-helicopter/7936/,(New High Tech-EDGE) posted on Oct. 23, 2010.
http://www.scribb.com/doc/159484608/Aerodynamics-Clancy#scribd, Published by: Arvind Rajan on Aug. 11, 2013, Clancy L.J.—Aerodynamics 1st Edition 1975 p. 407 Equation 14.9. https://web.archive.org/web/20130711053743/http://www.cfidarren.com/hlesson5.htm, (Smith) Jul. 11, 2013.
International Search Report and Written Opinion; International Application No. PCT/US2015/038796; International Filing Date: Jul. 1, 2015; dated Dec. 11, 2015; 15 Pages.
International Search Report and Written Opinion; International Application No. PCT/US2015/044240; International Filing Date: Aug. 7, 2015; dated Jun. 30, 2016; 10 Pages.
International Search Report and Written Opinion; International Application No. PCT/US2015/051897; International Filing Date: Sep. 24, 2015; dated Apr. 8, 2016; 19 Pages.
International Search Report and Written Opinion; International Application No. PCT/US2015/052619; International Filing Date: Sep. 28, 2015; dated Mar. 3, 2016; 13 Pages.
International Search Report and Written Opinion; International Application No. PCT/US2015/052645; International Filing Date: Sep. 28, 2015; dated Feb. 9, 2016; 13 Pages.
International Search Report and Written Opinion; International Application No. PCT/US2015/052802; International Filing Date: Sep. 29, 2015; dated Apr. 1, 2016; 14 Pages.
International Search Report and Written Opinion; International Application No. PCT/US2015/052864; International Filing Date: Sep. 29, 2015; dated Feb. 12, 2016; 15 Pages.
International Search Report and Written Opinion; International Application No. PCT/US2015/052874; International Filing Date: Sep. 29, 2015; dated Mar. 3, 2016; 16 Pages.
Johnson et al.,"Design and Performance of Lift-Offset Rotorcraft for Short-Haul Missions"; NASA Ames Research Center, Moffett Field, California; Presented on Jan. 18, 2012; 26 pages.
Johnson, Wayne; "Influence of Lift Offset on Rotorcraft Performance", Aeromechanics Branch, NASA Ames Research Center, Moffett Field, California; presented Jan. 23, 2008; 31 pages.
Notification of Transmittal of the International Search Report for International Application No. PCT/US2015/053099 dated Feb. 2, 2015; dated Feb. 10, 2015; 12 pages.
Notification of Transmittal of the International Search Report for International Application No. PCT/US2015/053223 dated Jan. 26, 2016; dated Feb. 12, 2016; 8 pages.
Notification of Transmittal of the International Search Report for International Application No. PCT/US2015/053229 dated Feb. 8, 2016; dated Feb. 19, 2016; 10 pages.

(56) References Cited

OTHER PUBLICATIONS

Notification of Transmittal of the International Search Report for International Application No. PCT/US2015/053235 dated Feb. 4, 2016; dated Feb. 23, 2016; 7 pages.
Notification of Transmittal of the International Search Report for International Application No. PCT/US2015/053432 dated Feb. 5, 2016; dated Feb. 26, 2016; 9 pages.
Notification of Transmittal of the International Search Report for International Application No. PCT/US2015/053479 dated Feb. 8, 2016; dated Feb. 23, 2016Y; 7 pages.
Notification of Transmittal of the International Search Report for International Application No. PCT/US15/53090 dated Feb. 11, 2016; dated Feb. 26, 2016; 11 pages.
Notification of Transmittal of the International Search Report for International Application No. PCT/US15/53530 dated Feb. 9, 2016; dated Mar. 4, 2016; 7 pages.
Notification of Transmittal of the International Search Report for International Application No. PCT/US2015/052820 dated Feb. 18, 2016; dated Jun. 3, 2016; 12 pages.
Notification of Transmittal of the International Search Report for International Application No. PCT/US2015/053241 dated Sep. 30, 2015; dated Feb. 23, 2016; 7 pages.
Notification of Transmittal of the International Search Report for International Application No. PCT/US2015/52907 dated Sep. 29, 2015; dated Mar. 3, 2016; 7 pages.
S-69 (XH-59A) Advancing Blade Concept Demonstrator, Sikorsky Archives, Apr. 21, 2013 retrieved online: <http://www.sikorskyarchives.com/S-69%20(XH-59A).php>; pp. 1, 4-6, 11 and 12.
Sikorsky—S-97 raider X2 Technology Family of Helicopters SAR & Combat Simulation [360p]'. Arronlee33. Jul. 31, 2013 [online], [retrieve on Mar. 2, 2016]. Retrieved from the internet:<URL:http://www.youtube.com/watch?v=TRv5OxPFeQo> Entire document.
Sikorsky S-97 Raider Aircraft'. The Editors. (Sep. 26, 2013) [online]. Retrieved from the internet: <URL:http://www.richardcyoung.com/terrorism/weapons/x2-raider-prototype/> Entire document, especially Fig. 2.
The Rise of Radical New Rotorcraft'.Wise. Mar. 6, 2014 [online]. Retrieved from the internet : <URL:http://www.popularmechanics.com/flight/a10616/the-rise-of-radical-new-rotorcraft-16850989/> Entire document, especially para [3]; Fig.3.
Written Opinion of the International Searching Authority for International Application No. PCT/US15/53090 dated Feb. 11, 2016; dated Feb. 26, 2016; 10 pages.

Written Opinion of the International Searching Authority for International Application No. PCT/US15/53530 dated Feb. 9, 2016; dated Mar. 4, 2016; 4 pages.
Written Opinion of the International Searching Authority for International Application No. PCT/US2015/053099 dated Feb. 2, 2015; dated Feb. 10, 2015; 9 pages.
Written Opinion of the International Searching Authority for International Application No. PCT/US2015/053223 dated Jan. 26, 2013; dated Feb. 12, 2016; 4 pages.
Written Opinion of the International Searching Authority for International Application No. PCT/US2015/053229 dated Feb. 8, 2016; dated Feb. 19, 2016; 10 pages.
Written Opinion of the International Searching Authority for International Application No. PCT/US2015/053235 dated Feb. 4, 2016; dated Feb. 23, 2016; 4 pages.
Written Opinion of the International Searching Authority for International Application No. PCT/US2015/053241 dated Sep. 30, 2016; dated Feb. 23, 2016; 5 pages.
Written Opinion of the International Searching Authority for International Application No. PCT/US2015/053432 dated Feb. 5, 2016; dated Feb. 26, 2016; 4 pages.
Written Opinion of the International Searching Authority for International Application No. PCT/US2015/053479 dated Feb. 8, 2016; dated Feb. 23, 2016Y; 4 pages.
Written Opinion of the International Searching Authority for International Application No. PCT/US2015/52820 dated Sep. 29, 2016; dated Jun. 3, 2016; 5 pages.
Written Opinion of the International Searching Authority for International Application No. PCT/US2015/52907 dated Sep. 29, 2015; dated Mar. 3, 2016; 6 pages.
Bourtsev, Boris et al.; "Coaxial Helicopter Rotor Design & Aeromechanics" Twentyfifth European Forum, 1999, pp. 1-20.
Coleman, Colin P. "A Survey of Theoretical and Experimental Coaxial Rotor Aerodynamic Research", Nasa Technical Paper 3675, 1997, pp. 1-34.
European Search Report for EP Application No. 15846472.7 dated Feb. 27, 2018; 13 pages.
Extended European Search Report for application No. 15846761.3; dated Apr. 23, 2018; 11 Pages.
Extended European Search Report for Application No. 15847641.6-1010, dated Apr. 20, 2018 (7 pp.).
Extended European Search Report issued in EP Application No. 15847201.9 dated May 14, 2018, 5 pages.
Field Manual 1-514; "Fundamentals of Rotor and Power Train Maintenance—Techniques and Procedures"; Ch. 2 Fundamentals of rotors; http://enlistement.us/field-manuals/fm-1-514-fundamentals-of-rotor-and-power-train-maintenance.shtml (Year: 1991).

DUAL ROTOR, ROTARY WING AIRCRAFT

CROSS-REFERENCE TO RELATED APPLICATIONS

This application is a National Stage application of PCT/US2015/053223, filed Sep. 30, 2015, which claims the benefit of U.S. Provisional Application No. 62/058,424, filed Oct. 1, 2014, and U.S. Provisional Application No. 62/058,152 filed on Oct. 1, 2014, both of which are incorporated by reference in their entirety herein.

TECHNICAL FIELD

The subject matter disclosed herein relates generally to rotary wing aircraft and, more particularly, to a dual rotor, rotary wing aircraft.

SUMMARY

According to an embodiment, a main rotor blade assembly for a rotary wing aircraft is provided including a main rotor blade root region, a main rotor blade inboard region arranged outboard of said main rotor blade root region, a main rotor blade main region arranged outboard of said main rotor blade inboard region, and a main rotor blade tip region arranged outboard of said main rotor blade main region. At least one of chord, twist, sweep, airfoil shape, and thickness/chord of the main rotor blade assembly has been optimized to achieve balanced high speed forward flight and hover relative to both efficiency and high thrust capability.

In addition to one or more of the features described above, or as an alternative, in further embodiments, the main rotor blade root region extends from about 0% R to 20% R, the main rotor blade inboard region extends from about 20% R to 40% R, the main rotor blade main region extends from about 40% R to 90% R, and the main rotor blade tip region extends from about 90% R to 100% R.

In addition to one or more of the features described above, or as an alternative, in further embodiments the main rotor blade tip region has a large negative twist angle extending between about −1° and −8°.

In addition to one or more of the features described above, or as an alternative, in further embodiments the main rotor blade main region has a twist angle extending between about 3° and about −1°.

In addition to one or more of the features described above, or as an alternative, in further embodiments the twist angle of a portion of the main rotor blade main region varies at a constant rate.

In addition to one or more of the features described above, or as an alternative, in further embodiments the main rotor blade inboard region has a twist angle extending between about −6° and about 3°.

In addition to one or more of the features described above, or as an alternative, in further embodiments the twist angle of the main rotor blade inboard region varies at a constant rate.

In addition to one or more of the features described above, or as an alternative, in further embodiments the main rotor blade root region has a constant twist angle.

In addition to one or more of the features described above, or as an alternative, in further embodiments the main rotor blade root region has a twist angle of about −6°.

In addition to one or more of the features described above, or as an alternative, in further embodiments a portion of the main rotor blade root region adjacent the main rotor blade inboard region has a chord to radius ratio varying between about 0.04 and about 0.08.

In addition to one or more of the features described above, or as an alternative, in further embodiments the main rotor blade inboard region has a generally constant chord to radius ratio.

In addition to one or more of the features described above, or as an alternative, in further embodiments the chord to radius ratio of the main rotor blade inboard region is about 0.08.

In addition to one or more of the features described above, or as an alternative, in further embodiments the main rotor blade main region has a chord to radius ratio varying between about 0.05 and about 0.08.

In addition to one or more of the features described above, or as an alternative, in further embodiments the main rotor blade tip region has a chord to radius ratio varying between about 0.03 and about 0.05.

In addition to one or more of the features described above, or as an alternative, in further embodiments the main rotor blade assembly is configured for use in an aircraft having a counter-rotating, coaxial main rotor assembly.

In addition to one or more of the features described above, or as an alternative, in further embodiments the main rotor blade tip region has an aft tip sweep of about 25°.

In addition to one or more of the features described above, or as an alternative, in further embodiments a thickness to chord ratio of the rotor blade gradually decreases between the inboard region and the tip region from about 0.035 to about 0.01.

According to another embodiment, a rotary wing aircraft is provided including an airframe, an extending tail, and counter-rotating, coaxial main rotor assembly including an upper rotor assembly and a lower rotor assembly. At least one of the upper rotor assembly and the lower rotor assembly includes a main rotor blade. A translational thrust system includes a propeller positioned at the extending tail. The translational thrust system is configured to provide translational thrust to the airframe. The main rotor blade includes a root region, an inboard region, a main region, and a tip region. At least one of chord, twist, sweep, airfoil shape, and thickness/chord of the main rotor blade assembly has been optimized to achieve balanced high speed forward flight and hover relative to both efficiency and high thrust capability.

In addition to one or more of the features described above, or as an alternative, in further embodiments at least one of sweep, chord, twist, and thickness to chord ratio of the rotor blade is defined by Tables 1-5.

BRIEF DESCRIPTION OF THE DRAWINGS

Referring now to the drawings wherein like elements are numbered alike in the several FIGURES.

DETAILED DESCRIPTION

Figure 1:
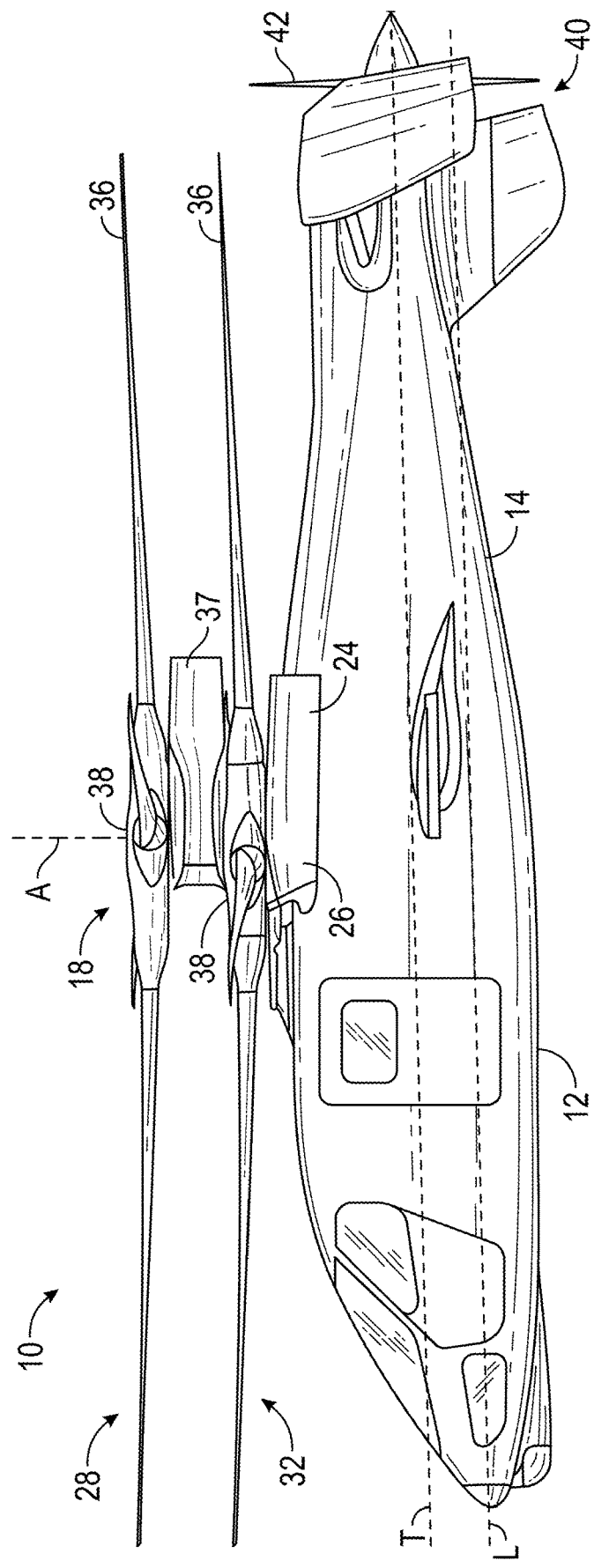
FIG. 1 depicts a rotary wing aircraft in an exemplary embodiment.

FIG. 1 depicts an exemplary embodiment of a rotary wing, vertical takeoff and land (VTOL) aircraft 10. The aircraft 10 includes an airframe 12 with an extending tail 14. A dual, counter rotating, coaxial main rotor assembly 18 is located at the airframe 12 and rotates about a main rotor axis, A. In an exemplary embodiment, the airframe 12 includes two seats for flight crew (e.g., pilot and co-pilot) and six seats for passengers. The main rotor assembly 18 is driven by a power source, for example, one or more engines 24 via a gearbox 26. The main rotor assembly 18 includes an upper rotor assembly 28 driven in a first direction (e.g., counter-clockwise) about the main rotor axis, A, and a lower rotor assembly 32 driven in a second direction (e.g., clockwise) about the main rotor axis, A, opposite to the first direction (i.e., counter rotating rotors). Each of the upper rotor assembly 28 and the lower rotor assembly 32 includes a plurality of rotor blades 36 secured to a rotor hub 38. In some embodiments, the aircraft 10 further includes a translational thrust system 40 located at the extending tail 14 to provide translational thrust (forward or rearward) for aircraft 10.

Any number of blades 36 may be used with the rotor assembly 18. FIG. 2A depicts a planform of a rotor blade 36 in an exemplary embodiment. The rotor assembly 18 includes a rotor hub fairing 37 generally located between and around the upper and lower rotor assemblies such that the rotor hubs 38 are at least partially contained therein. The rotor hub fairing 37 provides drag reduction. Rotor blades 36 are connected to the upper and lower rotor hubs 38 in a hingeless manner, also referred to as a rigid rotor system. Although a particular aircraft configuration is illustrated in this non-limiting embodiment, other rotary-wing aircraft will also benefit from embodiments of the invention. Although, the dual rotor system is depicted as coaxial, embodiments include dual rotor aircraft having non-coaxial rotors.

The translational thrust system 40 includes a propeller 42 connected to and driven by the engine 24 via the gearbox 26. The translational thrust system 40 may be mounted to the rear of the airframe 12 with a translational thrust axis, T, oriented substantially horizontal and parallel to the aircraft longitudinal axis, L, to provide thrust for high-speed flight. The translational thrust axis, T, corresponds to the axis of rotation of propeller 42. While shown in the context of a pusher-prop configuration, it is understood that the propeller 42 could also be more conventional puller prop or could be variably facing so as to provide yaw control in addition to or instead of translational thrust. It should be understood that any such system or other translational thrust systems may alternatively or additionally be utilized. Alternative translational thrust systems may include different propulsion forms, such as a jet engine.

Figure 2:
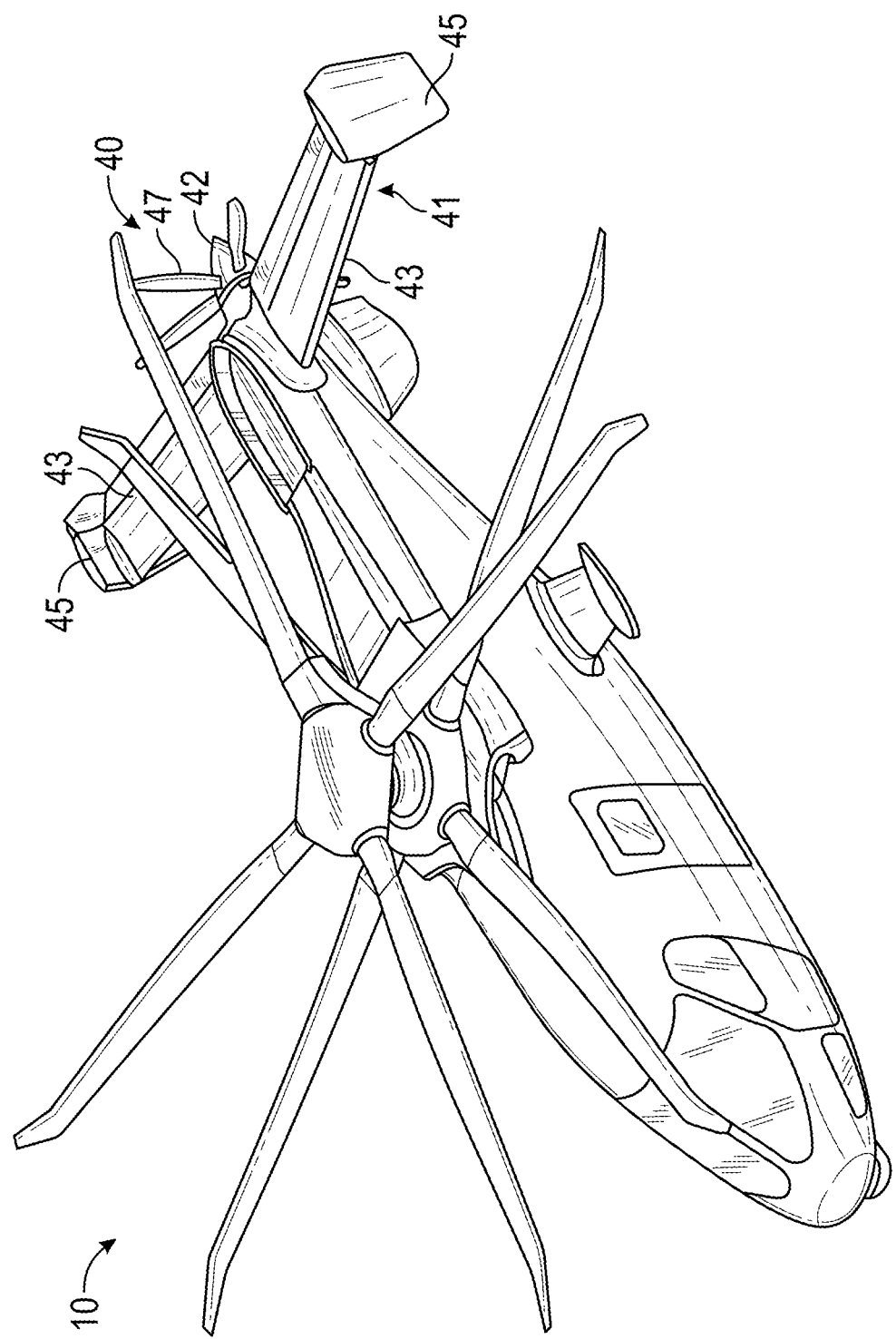
FIG. 2 is a perspective view of a rotary wing aircraft in an exemplary embodiment.
Figure 2A:
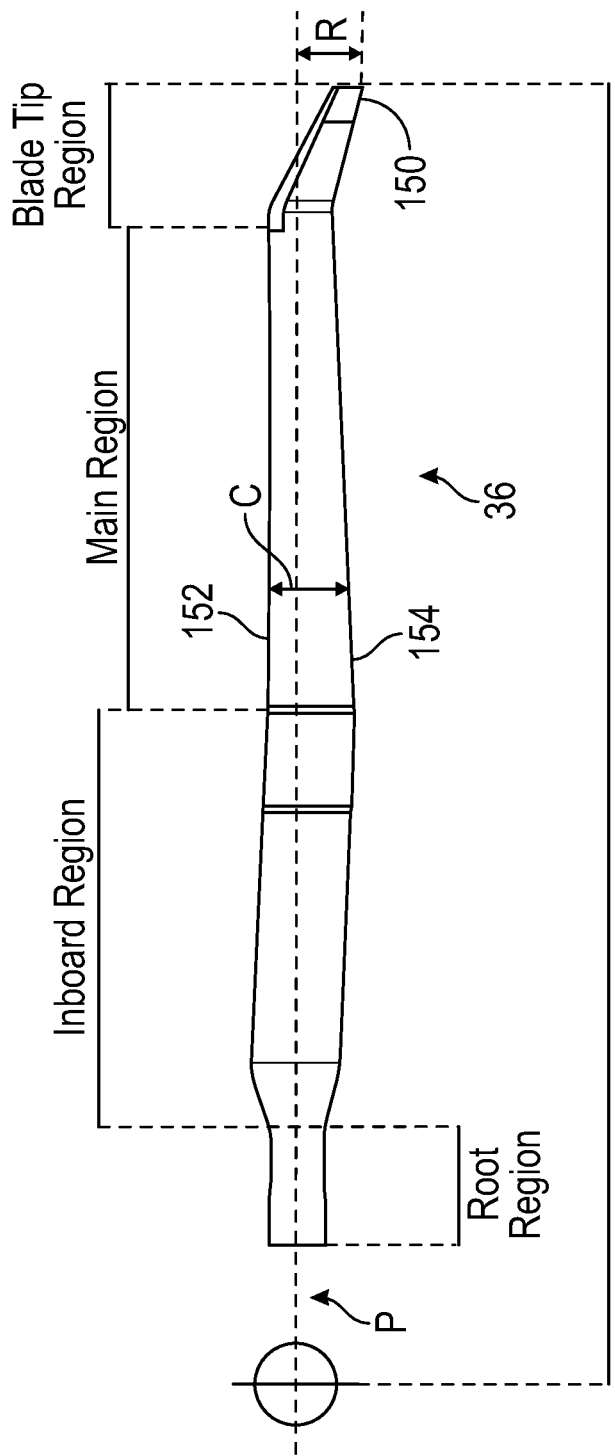
FIG. 2A depicts a planform of a rotor blade in an exemplary embodiment.

Referring to FIG. 2, translational thrust system 40 includes a propeller 42 and is positioned at a tail section 41 of the aircraft 10. Propeller 42 includes a plurality of blades 47. In exemplary embodiments, the pitch of propeller blades 47 may be altered to change the direction of thrust (e.g., forward or rearward). The tail section 41 includes active elevators 43 and active rudders 45 as controllable surfaces.

Figure 3:
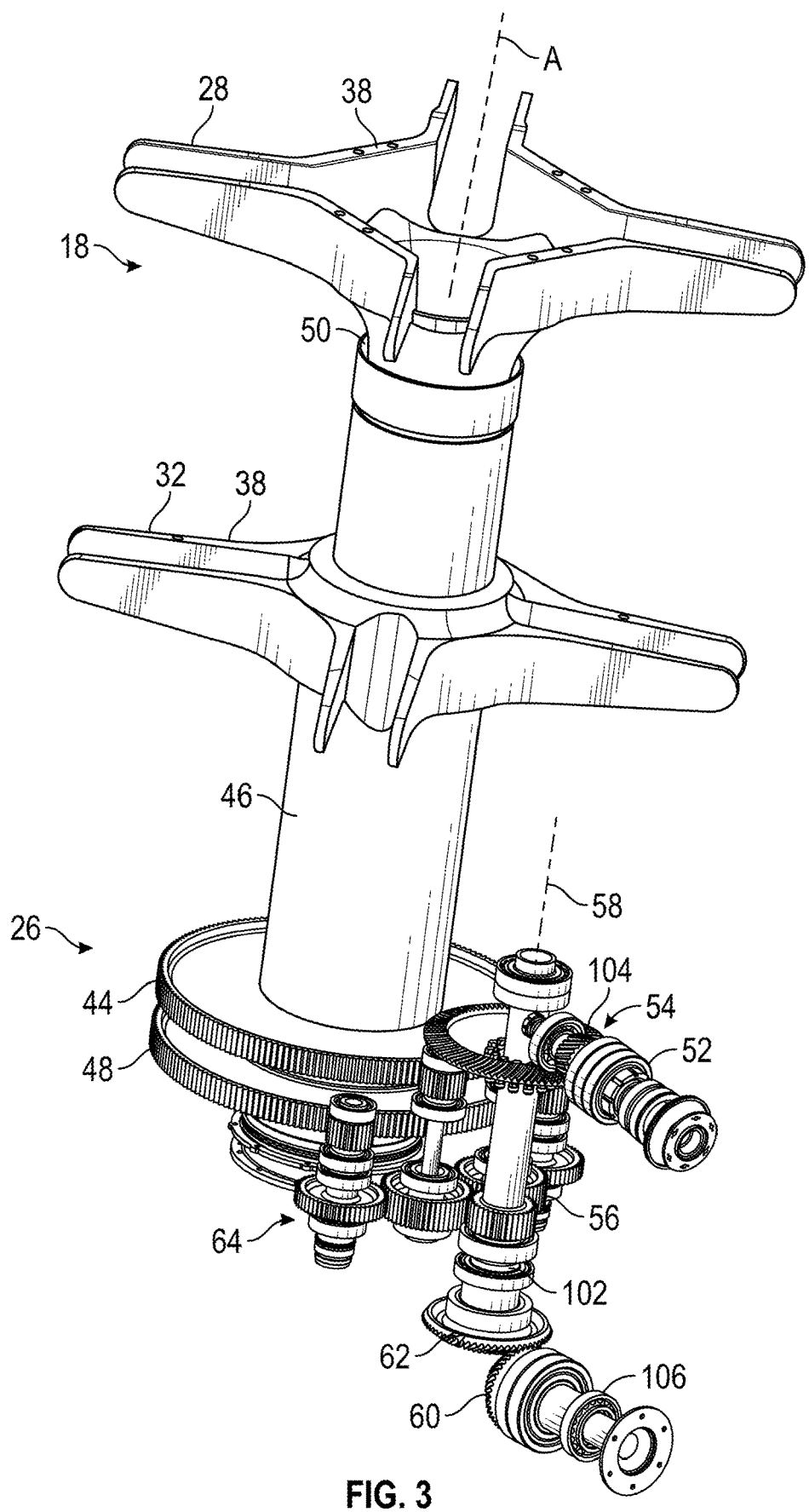
FIG. 3 is a perspective view of a gear train for a rotary wing aircraft in an exemplary embodiment.

Shown in FIG. 3 is a perspective view of portions of main rotor assembly 18 and gearbox 26. The gearbox 26 includes an upper bull gear 44 rotates about the main rotor axis, A, and connected to the lower rotor assembly 32 via a lower rotor shaft 46 extending along the main rotor axis, A. A lower bull gear 48 rotates about the main rotor axis, A, and is connected to the upper rotor assembly 28 via an upper rotor shaft 50 extending along the main rotor axis, A, and through an interior of the lower rotor shaft 46. Torque and rotational speed are provided to the gearbox 26 via input shaft 52 that transmits the torque and rotational speed from the engine(s) 24 to an input bevel gear 54 disposed at an input bevel shaft 56 of the gearbox 26 via an input bevel pinion 104. In some embodiments, the input bevel shaft 56 rotates about an input bevel shaft axis 58 parallel to the main rotor axis A. The propeller 42 is driven by a propeller output shaft 106 driven by a propeller output gear 62 disposed at a quill shaft 102, or an extension of input bevel shaft 56. Transfer from the propeller output gear 62 is achieved via connection with a propeller output pinion 60 at the propeller output shaft 106. To transfer torque from the input bevel shaft 56 to the lower rotor assembly 32 and the upper rotor assembly 30, the gearbox 26 includes a torque split gear reduction stage 64. The torque split gear reduction stage 64 splits torque from the input shaft 52 and applies the divided torque to bull gears 44 and 48, respectively. While shown with the propeller output shaft 106 driven by the propeller output gear 62, it is understood that such elements could be removed where the propeller 42 is not used or is separately driven.

Figure 3A:
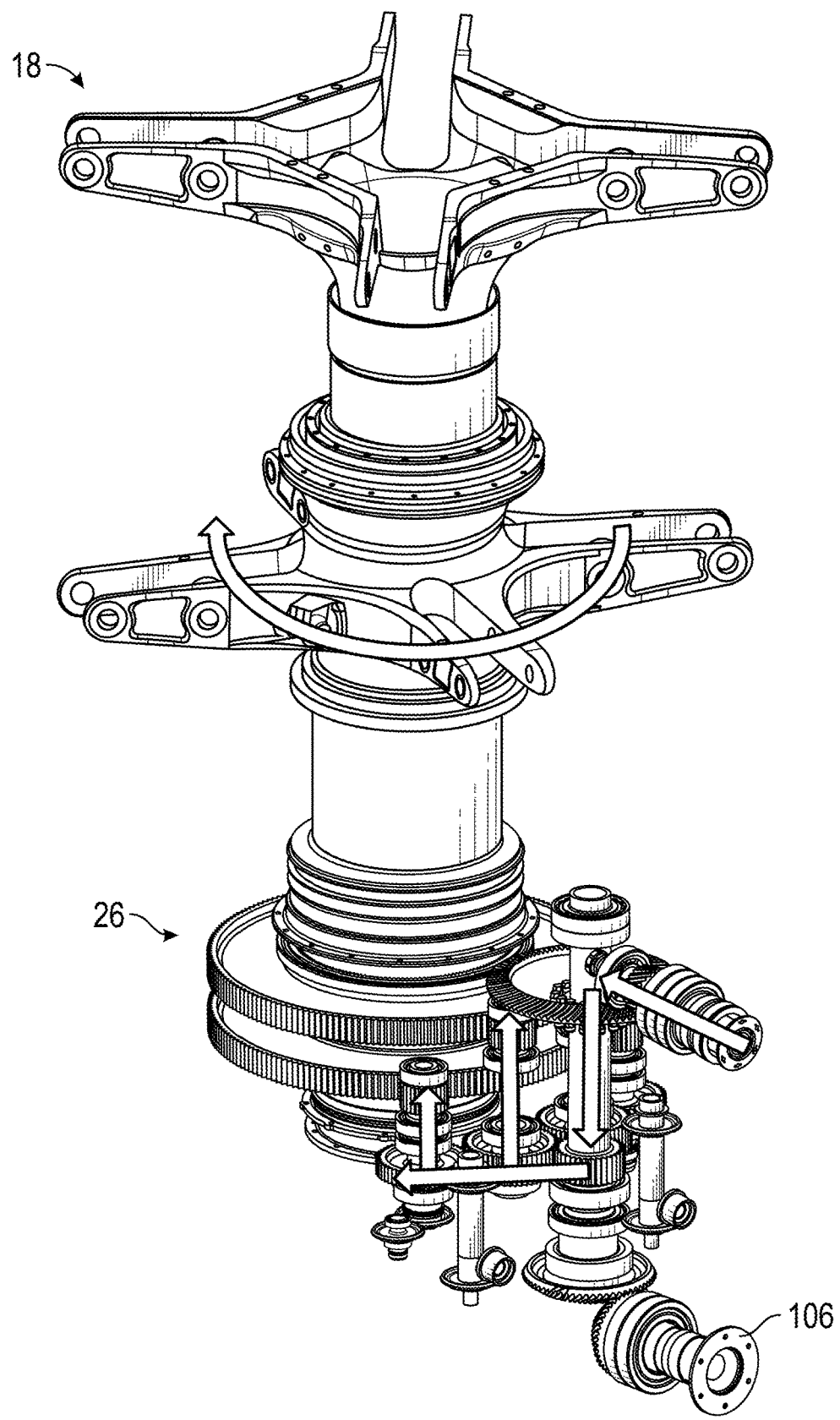
FIGS. 3A and 3B depict power distribution in the gear box in hover and cruise modes in exemplary embodiments.

FIG. 3A illustrates power distribution through gearbox 26 to main rotor assembly 18 and propeller output shaft 106 during hover mode. In hover, power flows to torque split section to drive main rotor assembly 18. The propeller output shaft 106 spins at all times to drive features on propeller box while propeller 42 is unclutched. During hover mode, the majority of power flows to the main rotor assembly 18.

Figure 3B:
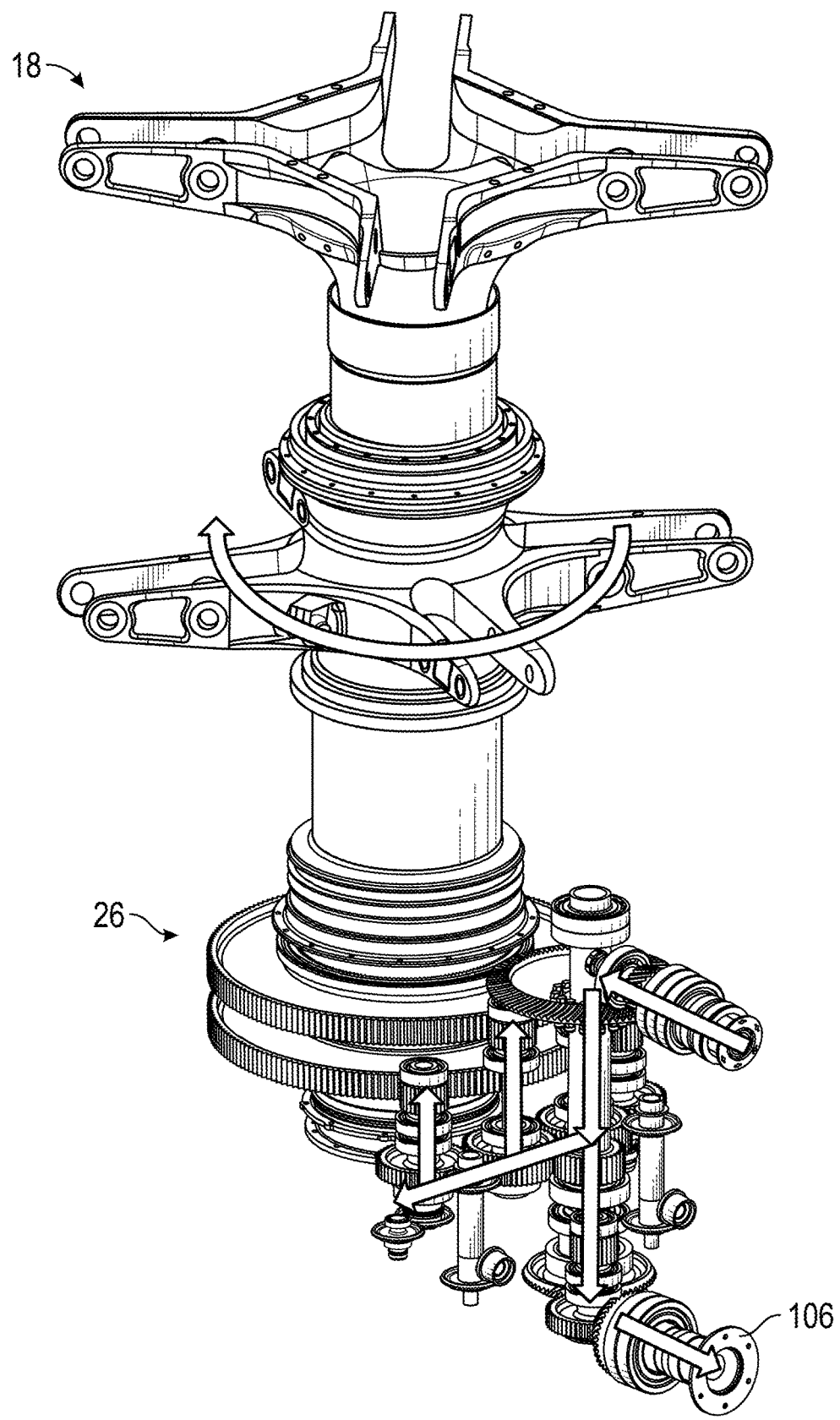

FIG. 3B illustrates power distribution through gearbox 26 to main rotor assembly 18 and propeller output shaft 106 during cruise mode. In high speed cruise, the majority of power flows to the propeller output shaft 106 while the main rotor assembly 18 is operating near an autorotative state.

Figure 3C:
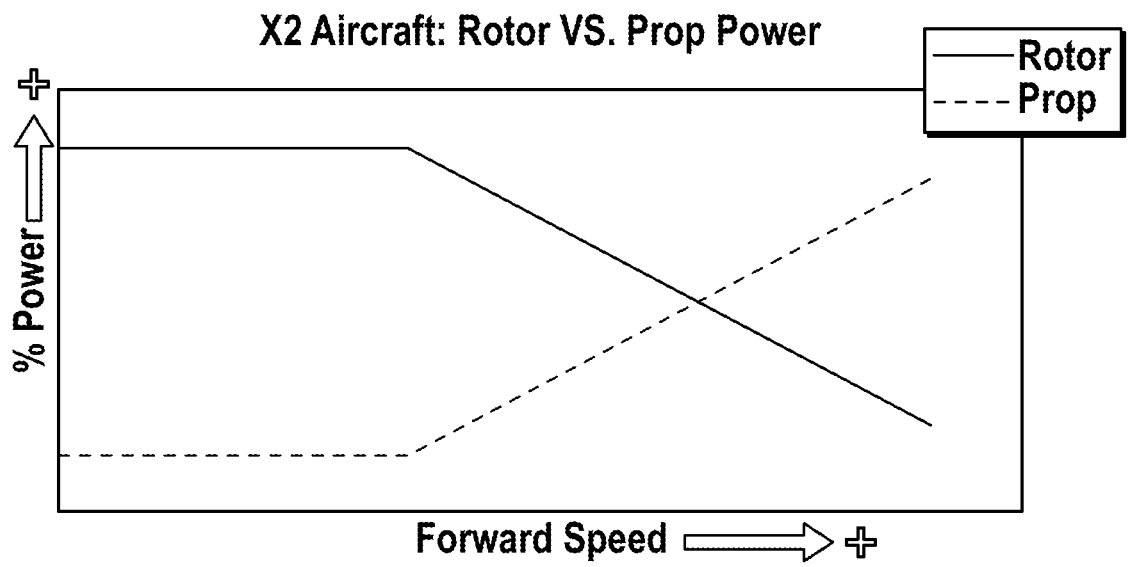
FIG. 3C depicts plots of percentage of power versus airspeed for a main rotor assembly and a propeller in an exemplary embodiment.

FIG. 3C depicts a plot of percentage of power versus airspeed for the main rotor assembly 18 and the propeller 42. The power between the main rotor assembly 18 and the propeller 42 is inversely proportional to air speed, once the aircraft reaches a propeller engagement speed. For example, at low airspeeds (e.g. below 100 kts), power is 100% used by the main rotor assembly 18. At the transition speed where the propeller 42 engages, the propeller 42 begins to use aircraft power. As airspeed increases, the main rotor assembly 18 power decreases and the propeller 42 power increases.

Figure 3D:
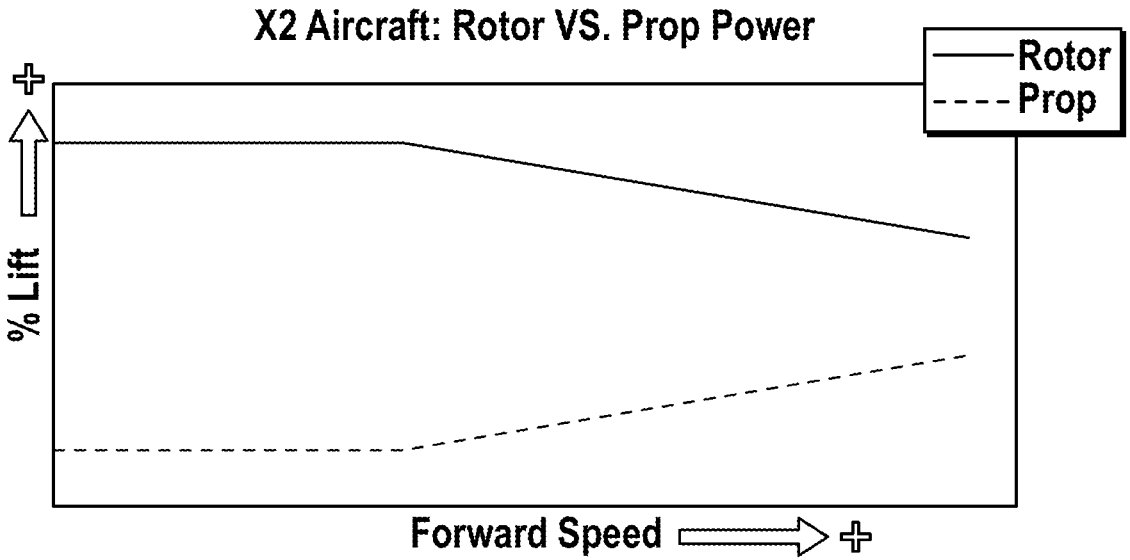
FIG. 3D depicts plots of percentage of lift versus airspeed for a main rotor assembly and a propeller in an exemplary embodiment.

FIG. 3D depicts plots of percentage of lift versus airspeed for the main rotor assembly 18 and the propeller 42 in an exemplary embodiment. When aircraft 10 is flown in a nose up orientation, lift may be provided from the propeller 42. The lift supplied by the main rotor assembly 18 and the propeller 42 is inversely proportional to air speed, once the aircraft reaches a propeller engagement speed. For example, at low airspeeds (e.g. below 100 kts), lift is 100% provided by the main rotor assembly 18. At the transition speed where the propeller 42 engages, the propeller 42 begins to provide lift. As airspeed increases, the main rotor assembly 18 lift decreases and the propeller 42 lift increases.

Figure 4:
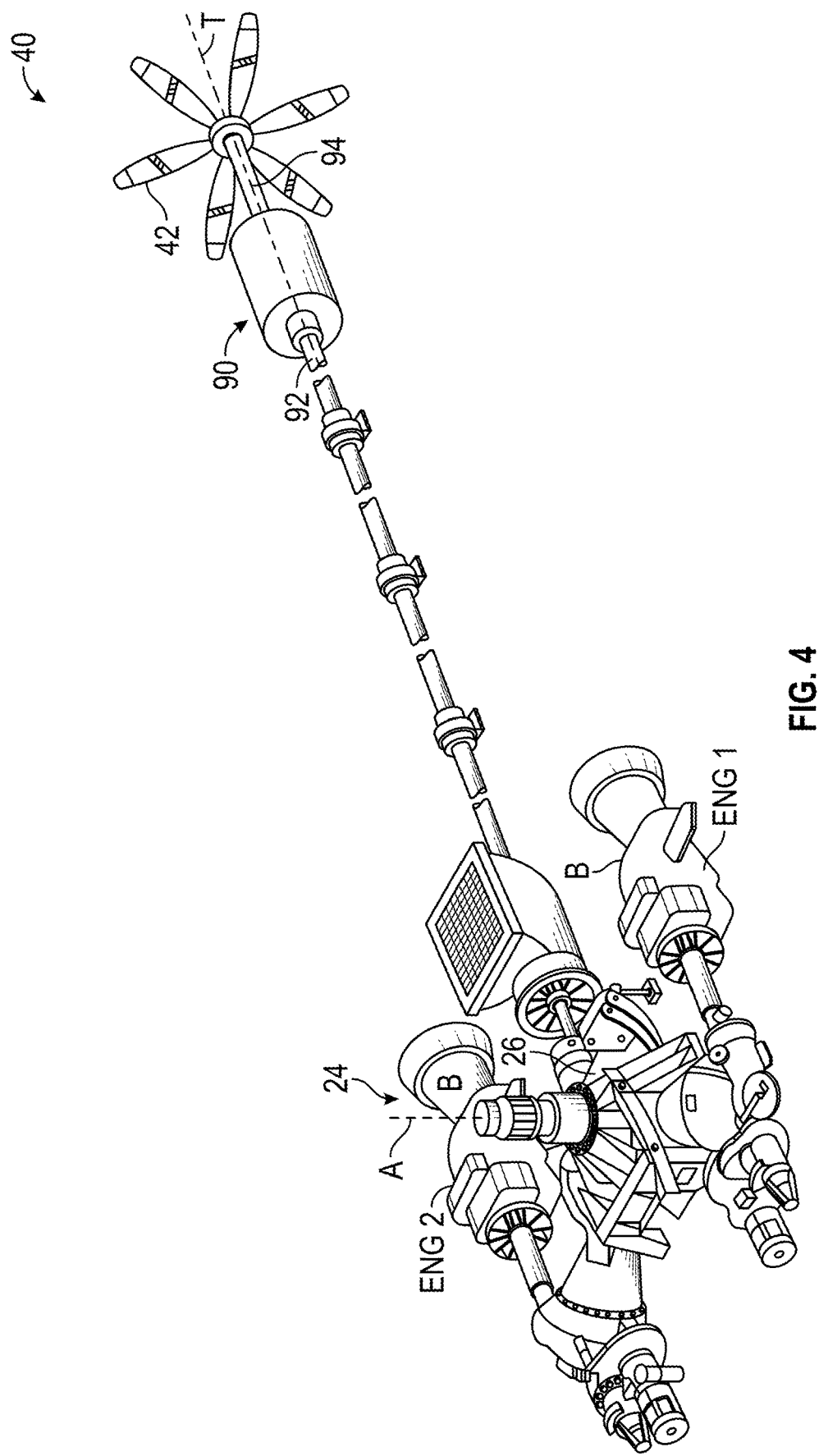
FIG. 4 is a perspective view of a gearbox and translational thrust system in an exemplary embodiment.

Referring to FIG. 4, the main rotor assembly 18 is driven about the axis of rotation, A, through a main gearbox (MGB) 26 by a multi-engine powerplant system 24, having two engine packages ENG1, ENG2 in the example in FIG. 4. Although FIG. 4 depicts two engines 24, it is understood that aircraft 10 may use a single engine 24. The multi-engine powerplant system 24 generates power available for flight operations and couples such power to the main rotor assembly 18 and the translational thrust system 40 through the MGB 26. The MOB 26 may be interposed between the powerplant system 24, the main rotor assembly 18 and the translational thrust system 40.

A portion of the drive system downstream of the MOB 26 includes a combined gearbox 90 (also referred to as a clutch). The combined gearbox 90 selectively operates as a clutch and a brake for operation of the translational thrust system 40 with the MOB 26. The combined gearbox 90 also operates to provide a rotor brake function for the main rotor assembly 18.

The combined gearbox 90 generally includes an input 92 and an output 94 generally defined along an axis parallel to rotational axis, T. The input 92 is generally upstream of the combined gearbox 90 relative the MGB 26 and the output 94 is downstream of the combined gearbox 90 and upstream of the translational thrust system 40 (FIG. 2). The combined gearbox 90 may be categorized by the technique used to disengage-engage (e.g., clutch) or stop (e.g., brake) the load such as friction, electromagnetic, mechanical lockup, etc., and by the method used to actuate such as mechanical, electric, pneumatic, hydraulic, self-activating, etc. It should be understood that various combined gearbox 90 systems may be utilized to include but not to be limited to mechanical, electrically, hydraulic and various combinations thereof.

Figure 5:
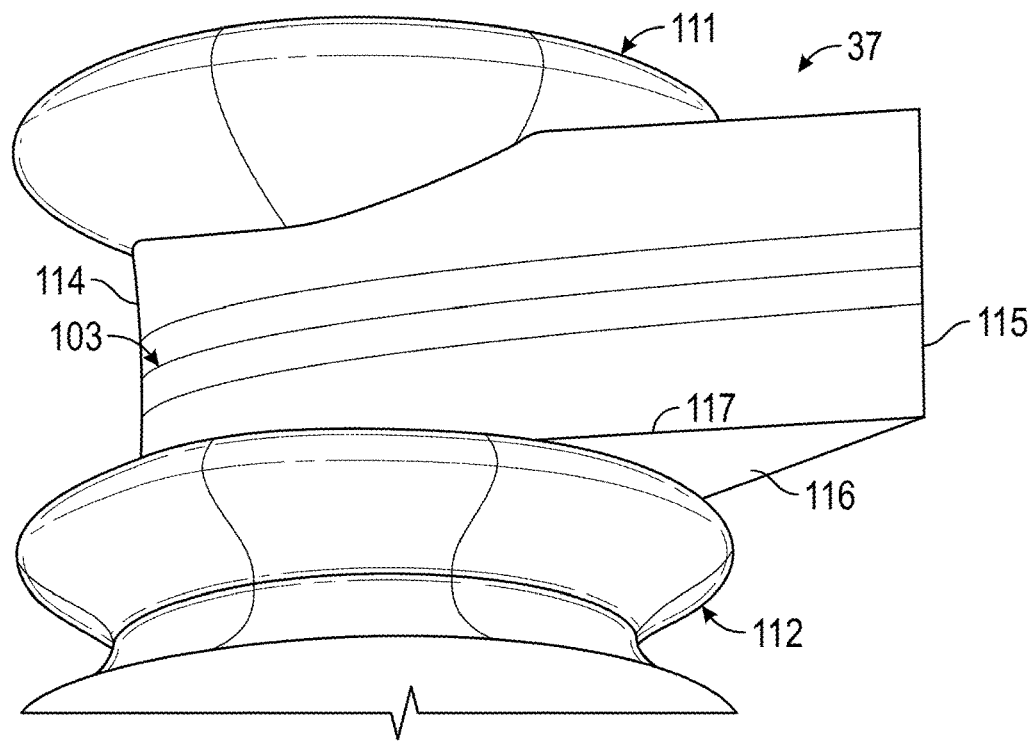
FIG. 5 is a perspective view of a rotor hub fairing in an exemplary embodiment.

Referring to FIG. 5, an exemplary rotor hub fairing 37 is shown. Rotor hub fairing 37 is illustrated having generally elliptical, in cross-section, upper and lower hub fairings 111 and 112, and an airfoil-type shape (in horizontal cross-section) for the shaft fairing 103. The airfoil shape of the shaft fairing 103 includes a leading edge 114, and a trailing edge 115 aft of the upper and lower fairings 111, 112. The airfoil shape of the shaft fairing 103 additionally includes a chord (not shown) that connects the leading and trailing edges 114, 115 of the airfoil. In one embodiment, the airfoil shape, including the upper surface 116 and the lower surface 117, is symmetrical about a plane extending along the length of the shaft fairing 103 and containing the axis of rotation, A. As noted above, the upper and lower rotor hubs 38 may be positioned, at least partially, in the upper and lower fairings 111, 112.

Figure 6:
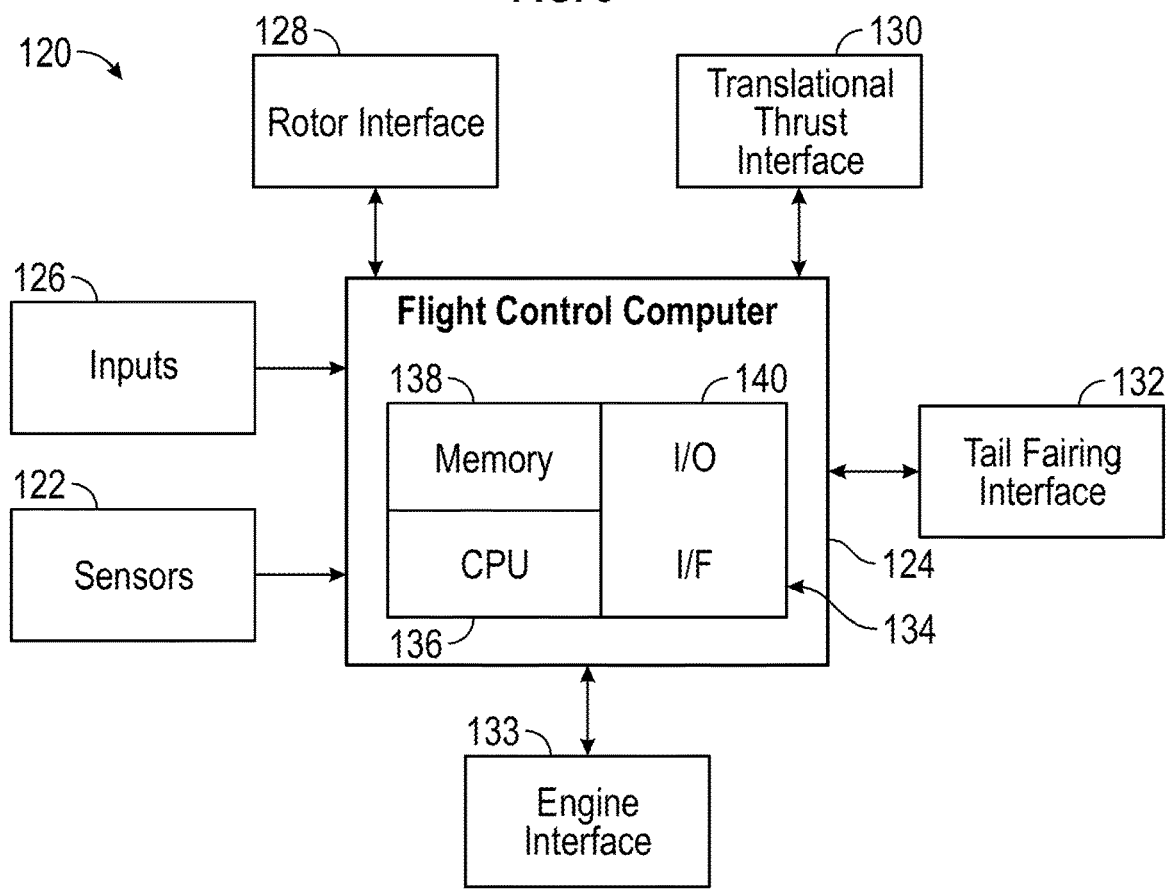
FIG. 6 depicts a flight control system in an exemplary embodiment.

Portions of the aircraft 10 are controlled by a flight control system 120 illustrated in FIG. 6. In one embodiment, the flight control system 120 is a fly-by-wire (FBW) control system. In a FBW control system there is no direct mechanical coupling between a pilot's controls and movable components of aircraft 10. Instead of using mechanical linkages, a FBW control system includes a plurality of sensors 122 which can sense the position of controlled elements and generate electrical signals proportional to the sensed position. The sensors 122 may also be used directly and indirectly to provide a variety of aircraft state data to a flight control computer (FCC) 124. The FCC 124 may also receive inputs 126 as control commands from various sources. For instance, the inputs 126 can be pilot inputs, auto-pilot inputs, navigation system based inputs, or any control inputs from one or more control loops executed by the FCC 124 or other subsystems. In response to inputs from the sensors 122 and inputs 126, the FCC 124 transmits signals to various subsystems of the aircraft 10.

Flight control system 120 may include a rotor interface 128 configured to receive commands from the FCC 124 and control one or more actuators, such as a mechanical-hydraulic or electric actuators, for the upper rotor assembly 28 and lower rotor assembly 32. In an embodiment, inputs 126 including cyclic, collective, pitch rate, and throttle commands that may result in the rotor interface 128 driving the one or more actuators to adjust upper and lower swashplate assemblies (not depicted) for pitch control of the upper rotor assembly 28 and lower rotor assembly 32. Alternatively, pitch control can be performed without a swashplate assemblies using individual blade control (IBC) in the upper rotor assembly 28 and lower rotor assembly 32. The rotor interface 128 can manipulate the upper rotor assembly 28 and lower rotor assembly 32 independently. This allows different collective and cyclic commands to be provided to the upper rotor assembly 28 and lower rotor assembly 32.

Flight control system 120 may include a translational thrust interface 130 configured to receive commands from the FCC 124 to control one or more actuators, such as a mechanical-hydraulic or electric actuators, for the control of the translational thrust system 40. In an embodiment, inputs 126 may result in the translational thrust interface 130 controlling speed of propeller 42, altering the pitch of propeller blades 47 (e.g., forward or rearward thrust), altering the direction of rotation of propeller 42, controlling gearbox 90 to employ a clutch to engage or disengage the propeller 42, etc.

Flight control system 120 may include a tail fairing interface 132. The tail fairing interface 132 is configured to receive commands from the FCC 124 to control one or more actuators, such as a mechanical-hydraulic or electric actuators, for the active elevator 43 and/or active rudders 45 of FIG. 2. In an embodiment, inputs 126 include an elevator pitch rate command for the tail fairing interface 132 to drive the one or more actuators for pitch control of the active elevators 43 of FIG. 2. In an embodiment, inputs 126 include a rudder command for the tail fairing interface 132 to drive the one or more actuators for positional control of the active rudders 45 of FIG. 2.

Flight control system 120 may include an engine interface 133. The engine interface 133 is configured to receive commands from the FCC 124 to control engine(s) 24. In an embodiment, inputs 126 include a throttle command from the pilot to adjust the RPM of engine(s) 24. FCC 124 may also send commands to engine interface 133 to control the engine(s) in certain predefined operating modes (e.g., quiet mode).

The FCC 124 includes a processing system 134 that applies models and control laws to augment commands based on aircraft state data. The processing system 134 includes processing circuitry 136, memory 138, and an input/output (I/O) interface 140. The processing circuitry 136 may be any type or combination of computer processors, such as a microprocessor, microcontroller, digital signal processor, application specific integrated circuit, programmable logic device, and/or field programmable gate array, and is generally referred to as central processing unit (CPU) 136. The memory 138 can include volatile and non-volatile memory, such as random access memory (RAM), read only memory (ROM), or other electronic, optical, magnetic, or any other computer readable storage medium onto which data and control logic as described herein are stored. Therefore, the memory 138 is a tangible storage medium where instructions executable by the processing circuitry 136 are embodied in a non-transitory form. The I/O interface 140 can include a variety of input interfaces, output interfaces, communication interfaces and support circuitry to acquire data from the sensors 122, inputs 126, and other sources (not depicted) and communicate with the rotor interface 128, the translation thrust interface 130, tail faring interface 132, engine interface 133, and other subsystems (not depicted).

In exemplary embodiments, the rotor interface 128, under control of the FCC 124, can control the upper rotor assembly 28 and lower rotor assembly 32 to pitch in different magnitudes and/or different directions at the same time. This includes differential collective, where the upper rotor assembly 28 has a collective pitch different than the collective pitch of the lower rotor assembly 32, in magnitude and/or direction. Differential pitch control also includes differential cyclic pitch control, where the upper rotor assembly 28 has a cyclic pitch different than the cyclic pitch of the lower rotor assembly 32, in magnitude, axis of orientation (e.g., longitudinal or lateral) and/or direction. The differential collective and the differential cyclic pitch control may be accomplished using independently controlled swashplates in the upper rotor assembly 28 and lower rotor assembly 32. Alternatively, differential collective and the differential cyclic pitch control may be accomplished using individual blade control in the upper rotor assembly 28 and lower rotor assembly 32.

The ability to independently control the pitch of the upper rotor assembly 28 and lower rotor assembly 32 allows the lower rotor assembly 32 to be adjusted due to its position beneath the upper rotor assembly 28. The lower rotor assembly 32 is located in the downwash of the upper rotor assembly 28. To accommodate for this, the lower rotor assembly 32 may have a collective pitch that differs from the collective pitch of the upper rotor assembly 28.

In the case of traditional helicopters, as the forward velocity of the aircraft increases, the velocity of the retreating blade relative to the airflow decreases. This causes a stall region to arise at the root of the retreating blade and expand towards to distal end of the blade as speed increases. As this stall region increases, the overall lift vector of the aircraft shifts from the center of the aircraft towards the advancing blade which is providing the majority of lift for the aircraft. This imbalance of lift creates an unstable rolling moment on the aircraft which is stabilized by a combination of reducing forward flight and blade flapping, which reduces overall aircraft lift. With a dual rotor aircraft, such as aircraft 10, the counter rotating rotor heads balance out the torque generated by each rotor head and also balances the lift generated by each advancing blade without the need for blade flapping or reducing the speed of the aircraft. This is made possible by the rigid rotor system. With two rigid rotors, the roll moments cancel at the main rotor shaft.

The use of upper rotor assembly 28 and lower rotor assembly 32 allows the pre-cone angle to be set on each individual rotor to reduce bending stress on the blades. In a hinged rotor design, the hinges will naturally go to an angle to reduce bending stress. On a rigid rotor aircraft, such as aircraft 10, there is no hinge, so the pre-cone angle is set to avoid the extra stress attributed to the bending moment. A useful pre-cone angle is one where the centrifugal force of the blade pulling out matches the lift of the blade up. Due to the independent nature of the upper rotor assembly 28 and lower rotor assembly 32, differential pre-cone is used in aircraft 10. Differential pre-cone refers to the fact that the upper rotor assembly 28 and lower rotor assembly 32 have different pre-cone angles. The different pre-cone angles for the upper rotor assembly 28 and lower rotor assembly 32 help maintain tip clearance. In an exemplary embodiment, the pre-angle on the upper rotor assembly 28 is about 3 degrees and the pre-cone angle on the lower rotor assembly 32 is about 2 degrees.

Aircraft 10 is operational in a variety of modes, including take-off, cruise, landing, etc. Cruise mode refers to generally horizontal flight. During cruise, aircraft 10 can reach speeds of above about 200 knots, with speed reaching up to about 250 knots. During cruise mode, the main rotor assembly 18 provides the majority of lift for the aircraft. In exemplary embodiments and flight modes, the main rotor assembly 18 provides greater than about 85% of the lift during cruise mode.

Aircraft 10 may assume various acoustic modes, depending on the flight state. FCC 124 may control RPM of engines 24, RPM of propeller 42, and clutch 90 to engage or disengage the propeller 42 to assume different noise levels. For example, at take-off noise may not be a concern, and there would be no changes in aircraft operation to adjust the noise level. As the aircraft approaches a target, it may be desirable to disengage the propeller 42 using clutch 90 and/or reduce RPM of engines 24 to reduce the noise produced by aircraft 10. The propeller 42 may be disengaged at various other flight states (e.g., high speed) to reduce noise. The RPM of the main rotor assembly 18 and RPM of propeller 42 may be independently controlled (e.g., through clutch 90 or FCC 124). This allows a variety of flight states to be achieved.

The pilot may enter separate commands to reduce aircraft noise, for example, disengaging the propeller 42, reducing engine RPM, and increasing collective pitch as separate inputs. Alternatively, the pilot may select a reduced noise mode (e.g., quiet mode) through single input, and the FCC 124 controls the various aircraft interfaces to achieve the desired mode. For example, the pilot may select a reduced noise mode at input 126, and the FCC automatically disengages the propeller 42, reduces the engine 24 RPM and/or increases collective pitch without further demand on the pilot.

The use of the translational thrust system 40 allows the aircraft 10 to move forward or rearward (depending on the pitch of the propeller blades) independent of the pitch attitude of the aircraft. Cyclic is used to adjust the pitch attitude (nose up, nose down or level) of the aircraft while the translational thrust system 40 provides forward and rearward thrust.

The motor rotor assembly 18 system and the translational thrust system 40 are connected through the main gear box 26. A gear ratio of main gear box 26 is selected so as to keep propeller 42 at a high efficiency and suitable noise level during cruise mode. The gear ratio of main gear box 26 dictates the ratio of the rotor speed of main rotor assembly 18 to propeller speed of propeller 42.

Figure 10:
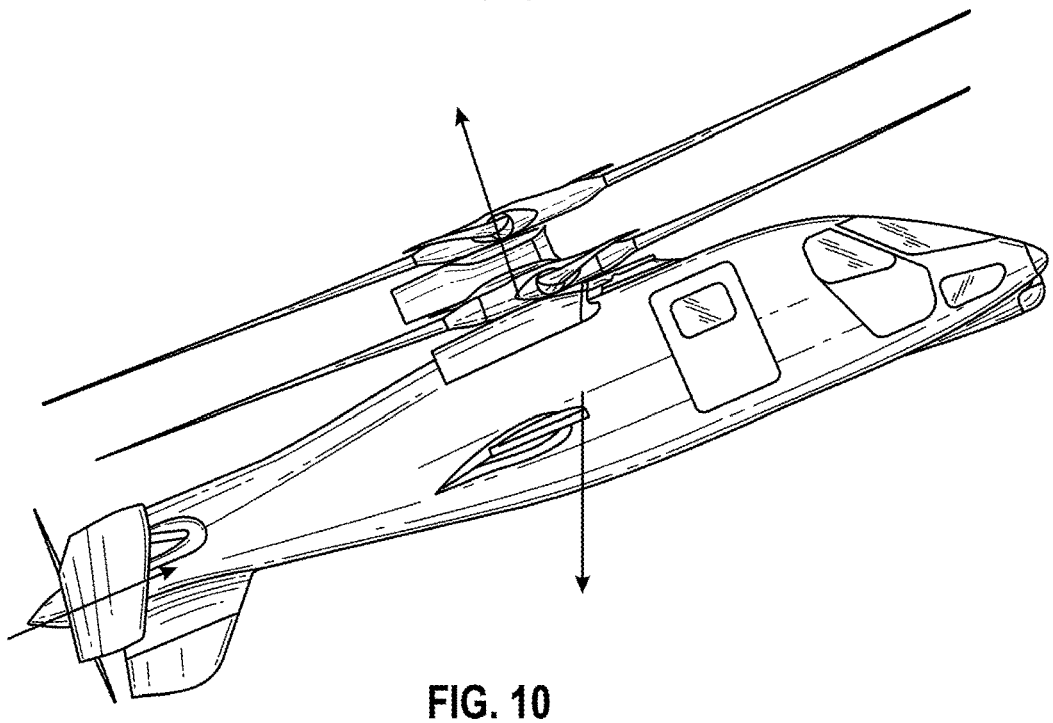
FIGS. 10 and 11 illustrate force vectors in exemplary hover states.
Figure 11:
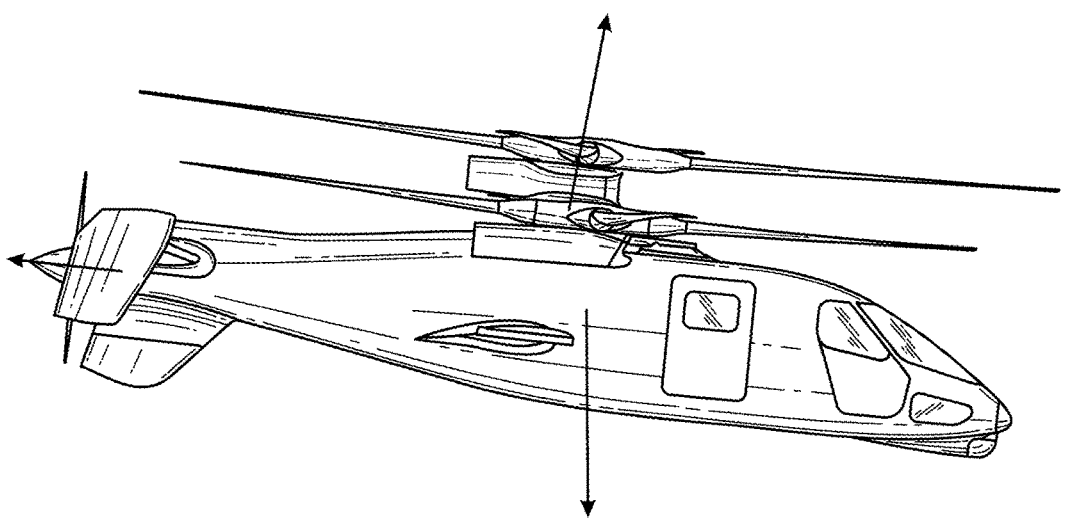

Embodiments of aircraft 10 provide the pilot with increased situational awareness by allowing the aircraft attitude (e.g., the angle of longitudinal axis, L, relative to horizontal) to be adjusted by cyclic pitch of the main rotor assembly 18 and the forward and rearward thrust to be controlled by the translational thrust system 40. This allows a variety of flight modes to be achieved, which allows the pilot to be more aware of their surroundings. Aircraft 10 can take off at a horizontal attitude (e.g., axis L is horizontal), which also may be referred to as vertical take-off. Aircraft 10 may also fly forward or cruise with the nose angled upwards, nose angled downwards or level. Aircraft 10 can hover with the nose angled upwards or downwards or level. FIGS. 10 and 11 illustrate force vectors from the main rotor assembly and propeller for hover nose up and hover nose down, respectively. Aircraft 10 can also land substantially parallel to a non-horizontal or sloped surface by adjusting the attitude of the aircraft using cyclic pitch of the main rotor assembly 18. The use of main rotor assembly 18 for aircraft attitude and the translational thrust system 40 for thrust allows aircraft 10 to assume a variety of trim states.

Embodiments provide independent control of the active elevators 43 and/or active rudders 45 as controllable surfaces in the tail section 41. The elevator surfaces 43 may be controlled independently by the FCC 124 through the tail faring interface 132. The rudder surfaces 45 may be controlled independently by the FCC 124 through the tail faring interface 132.

The configuration of aircraft 10 and the controlled afforded by FCC 124 allows aircraft 10 to provide a high bank angle capability at high speeds. For example, in an exemplary embodiment, aircraft 10 can achieve a bank angle of about 60 degrees at about 210 knots.

Aircraft 10 may make use of longitudinal lift offset in trim to compensate for rotor-on-rotor aerodynamic interaction between the upper rotor assembly 28 and lower rotor assembly 32. Aircraft 10 may adjust differential longitudinal cyclic as a function of operational states of the aircraft (e.g., take-off, cruise, land, etc.). Differential longitudinal cyclic refers to upper rotor assembly 28 and lower rotor assembly 32 having different cyclic pitch along the longitudinal axis of the aircraft. Differential longitudinal cyclic may also be used to generate yaw moments. Lift offset may be used to control aircraft, where lateral lift offset adjusts roll and longitudinal lift offset adjusts pitch.

FCC 124 may control RPM of engine(s) 24, RPM of propeller 42, and clutch 90 to engage or disengage the propeller 42 to assume different noise levels. For example, at take-off noise may not be a concern, and there would be no changes in aircraft operation to adjust the noise level. As the aircraft approaches a target, it may be desirable to disengage the propeller 42 using clutch 90 and/or reduce RPM of engines 24 to reduce the noise produced by aircraft 10. The propeller 42 may be disengaged at various other flight states (e.g., high speed) to reduce noise. The RPM of the main rotor assembly 18 and RPM of propeller 42 may be independently controlled (e.g., through clutch 90).

The pilot may enter separate commands to reduce aircraft noise, for example, disengaging the propeller 42 and reducing engine RPM as separate inputs. Alternatively, the pilot may select a reduced noise mode (e.g., quiet mode) through single input, and the FCC 124 controls the various aircraft interfaces to achieve the desired mode. For example, the pilot may select a reduced noise mode at input 126, and the FCC automatically disengages the propeller 42 and/or reduces the engine 24 RPM without further demand on the pilot.

Figure 7:
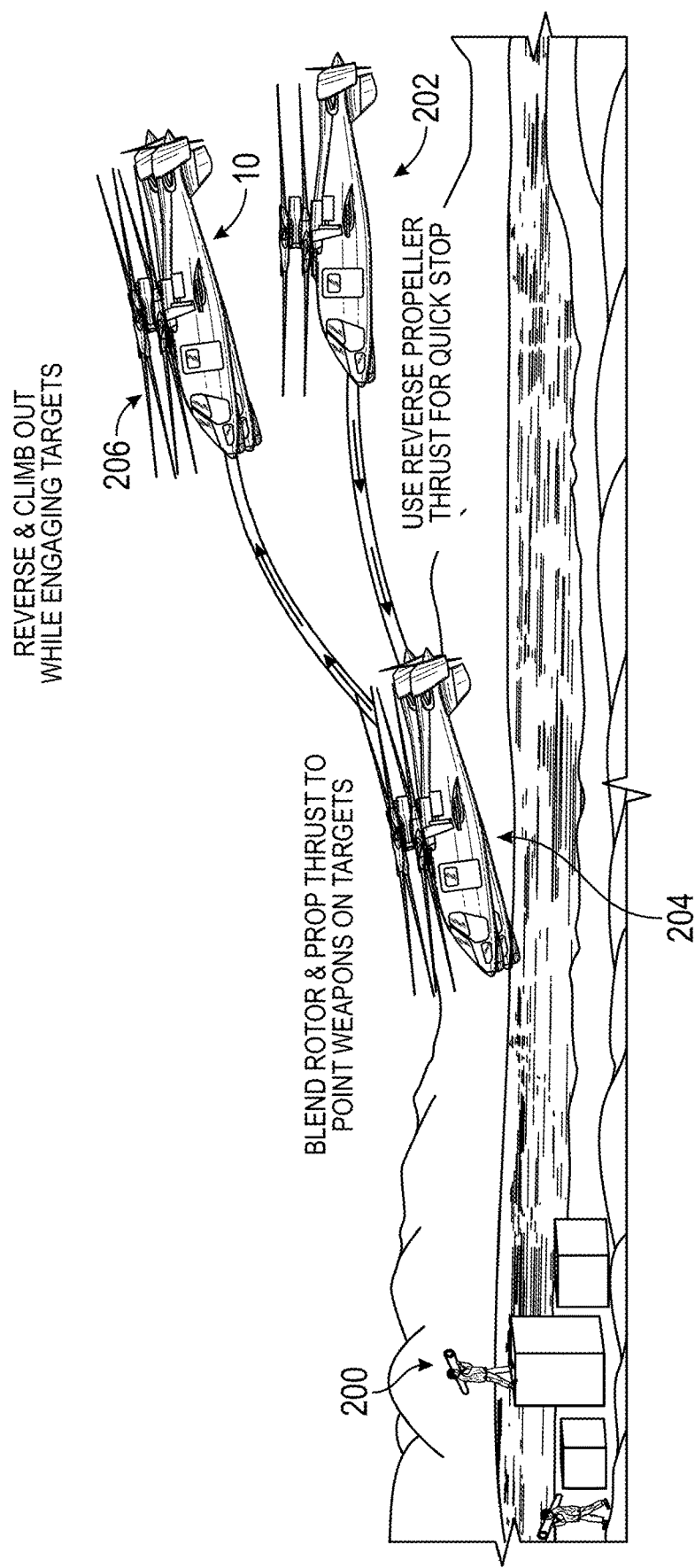
FIG. 7 depicts a flight maneuver in an exemplary embodiment.

Aircraft 10 provides the ability to approach a target and reverse thrust while maintaining an attitude directed at the target. FIG. 7 depicts aircraft 10 approaching a target 200. In a first state, 202, the aircraft 10 alters the pitch of blades 47 in propeller 42 to provide reverse thrust to bring the aircraft to a quick stop. At state 204, the main rotor assembly 18 and propeller 42 are controlled to pitch aircraft 10 towards target 200. At state 206, the propeller 42 is used to provide reverse thrust to move away from target 200 and climb, while still maintaining an attitude with the nose of aircraft 10 facing target 200.

The use of a dual rotor system and translational thrust allows aircraft 10 to eliminate the need for a variable angle between the main axis of rotation of the rotor system (e.g., axis A in FIG. 1) and aircraft longitudinal axis L. In conventional helicopters, the angle between the main axis of rotation of the rotor system and the aircraft longitudinal axis L varies. This is due to the fact that conventional helicopters lack a translational thrust system 40 for use during cruise mode, or forward flight. In a conventional helicopter, forward flight is provided through cyclic pitch, which causes the aircraft to point nose down. As this nose down orientation is undesirable beyond a certain angle, the angle between the main axis of rotation of the rotor system and the aircraft longitudinal axis L is adjusted to bring the nose upwards, while still in forward flight.

By contrast, aircraft 10, with translational thrust system 40, does not need to adjust the angle between the main axis of rotation of the rotor system (e.g., axis A in FIG. 1) and aircraft longitudinal axis L. The angle between the main axis of rotation of the rotor system (e.g., axis A in FIG. 1) and aircraft longitudinal axis L for aircraft 10 remains fixed during all flight modes, including take-off, cruise, landing, etc.

As shown in FIG. 1, the rotor assembly 18 includes a rotor hub fairing 37 generally located between and around the upper and lower rotor assemblies such that the rotor hubs 38 are at least partially contained therein. The rotor hub fairing 37 provides drag reduction. Referring to FIG. 5, an exemplary rotor hub fairing 37 is shown. Rotor hub fairing 37 is illustrated having generally elliptical, in cross-section, upper and lower hub fairings 111 and 112, and an airfoil-type shape (in horizontal cross-section) for the shaft fairing 103. The airfoil shape of the shaft fairing 103 includes a leading edge 114, and a trailing edge 115 aft of the upper and lower fairings 111, 112. The airfoil shape of the shaft fairing 103 additionally includes a chord (not shown) that connects the leading and trailing edges 114, 115 of the airfoil. In one embodiment, the airfoil shape, including the upper surface 116 and the lower surface 117, is symmetrical about a plane extending along the length of the shaft fairing 103 and containing the axis of rotation, A. As noted above, the upper and lower rotor hubs 38 may be positioned, at least partially, in the upper and lower fairings 111, 112.

The rotor hub fairing 37 is a sealed fairing, meaning there are few or no passages for air to travel through the interior of the rotor hub fairing 37. In conventional designs, control devices such as pushrods, are exposed near the rotor hubs. The surfaces of these components increase drag on the rotor assembly. The air gaps between various rotor structures (e.g., pushrods and main rotor shaft) also form areas of drag. The sealed rotor hub fairing 37 eliminates air pathways through the rotor hub structure, and eliminates drag associated with such air paths.

Another feature to reduce drag on the rotor hub is positioning control rods, such as push rods for rotor control, internal to the main rotor shaft. Referring to FIG. 3, pushrods for swashplates in the upper rotor assembly 28 and lower rotor assembly 32 are located internal to the lower rotor shaft 46 and upper rotor shaft 50. This prevents the pushrods from being exposed and increasing drag on the rotor hub. The use of a rigid rotor system aids in sealing the rotor hub faring 37.

In an exemplary embodiment, the distance between the hub of the upper rotor assembly 28 and the hub of the lower rotor assembly 32 ranges from about 2 feet to about 2.5 feet. In another exemplary embodiment, the distance between the hub of the upper rotor assembly 28 and the hub of the lower rotor assembly 32 ranges from about 2.1 feet to about 2.4 feet. In another exemplary embodiment, the distance between the hub of the upper rotor assembly 28 and the hub of the lower rotor assembly 32 is about 2.29 feet (0.7 meters).

Figure 9:
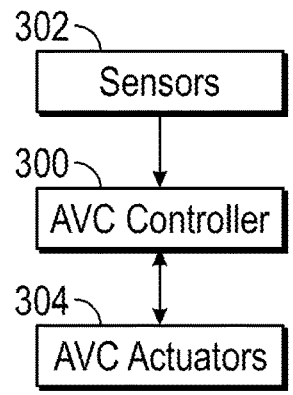
FIG. 9 depicts an active vibration control (AVC) system in an exemplary embodiment.

Aircraft 10 may employ an active vibration control (AVC) system to reduce vibration in the airframe 12. The use of a dual rotor, rigid rotor system tends to produce significant vibration in the airframe 12 and its systems. FIG. 9 depicts an AVC system in an exemplary embodiment. An AVC controller 300 executes an AVC control process to reduce vibration in aircraft 10. AVC controller 300 may be implemented as part of flight control system 120, executed by FCC 124, or may be a separate controller. One or more sensors 302 are located in aircraft 10 to detect vibration. Sensors may be located in a wide variety of positions, including airframe 12, gearbox 26, tail section 14, on main rotor assembly 18, cockpit, etc. It is understood that these locations are exemplary, and the AVC sensors 302 may be located in any position. AVC actuators 304 generate a force to dampen vibration in aircraft 10, as known in the art. AVC actuators 304 may be located in any position in the aircraft.

In operation, AVC controller 300 receives vibration signals from the AVC sensors 302. AVC controller 300 provides control signals to the AVC actuators 304 to generate forces to reduce the vibration sensed by the AVC sensors 302. Control signals to the AVC actuators 304 may vary in magnitude and frequency to cancel vibrations in aircraft 10. In an exemplary embodiment, AVC controller 300 operates in a feedback mode, where the control signals to AVC actuators 304 are adjusted in response to measured vibration from AVC sensors 302. In an alternate embodiment, AVC controller 300 does not actively measure vibration through AVC sensors 302. Rather, the AVC controller 300 obtains the rotor speed (e.g., through an RPM signal) and applies a control signal to the AVC actuators 304, in an open loop control mode.

The use of independently controlled upper rotor assembly 28 and the lower rotor assembly 32, along with other control surfaces, provides the ability to control yaw using a variety of elements. For example, below a first speed, (e.g., 40 knots), the FCC 124 uses differential collective pitch for yaw control. Above the first speed but below a second speed (e.g., 80 knots), a mix of differential collective and differential cyclic may be used to control yaw. The differential cyclic may be applied along the longitudinal and/or lateral axes of the aircraft. Further, wind direction may be measured by a sensor 122 and used to adjust the differential cyclic about the longitudinal and/or lateral axes. Above the second speed (e.g., 80 knots), the active rudders 45 are used as controllable surfaces to control yaw. The FCC 124 provides commands to the tail fairing interface 132 to control the rudders 45 to adjust yaw.

The use of active elevator 43, with independent control of a left elevator section and a right elevator section, provides for improved stability control. Flight control system 120 performs mixing of collective pitch of main rotor assembly 18 and an angle of elevator 43 to provide stability augmentation.

Figure 6A:
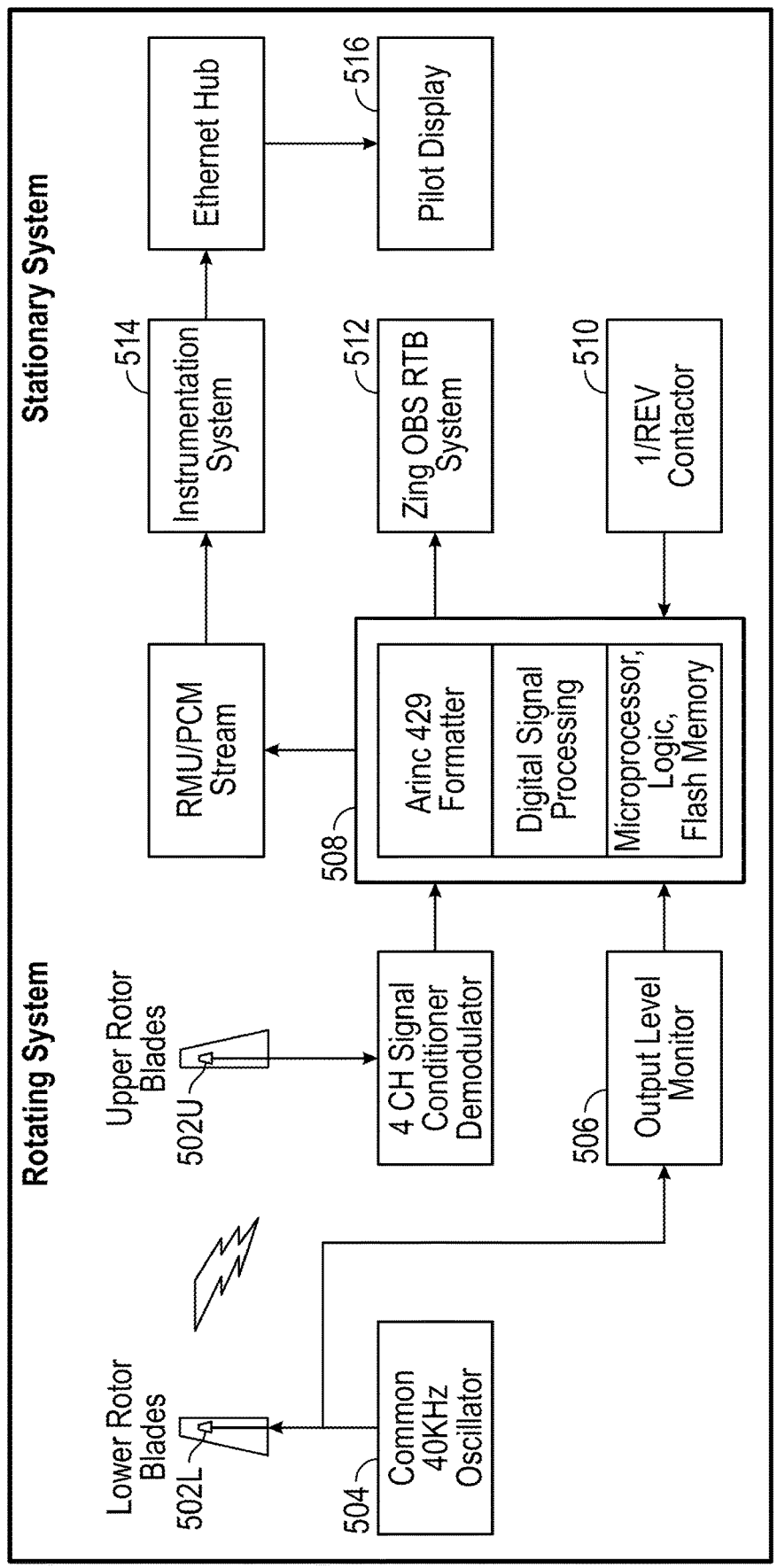
FIG. 6A depicts a blade proximity detection system in an exemplary embodiment.

Embodiments may use wireless techniques to provide tip clearance measurements. FIG. 6A depicts a blade proximity monitoring system in an exemplary embodiment. At least one upper rotor blade and at least one lower rotor blade is equipped with at least one antenna 502. Antennas 502 may be electric field antennas or magnetic field antennas. Antennas 502 may be implemented using compact ferrite core or small diameter magnet wire in the form of coils around the blade spar or embedded in the plane of the blade skin. The antennas 502 interact through the near field effect.

An oscillator 504 sends an excitation signal (e.g., 40 KHz) to a first antenna 502L. It is understood that the excitation signal may be sent to a plurality of antennas in different blades, including multiple antennas in the same blade. As the blades cross, a second antenna, 502 U, receives a signal emitted by the first antenna 502 L. An output level monitor 506 measures the magnitude of the excitation signal.

A blade proximity monitor 508 (e.g., a processor implemented controller) is mounted in the rotating system, e.g., in a rotor hub. This eliminates noise that may be introduced through a conventional slip ring used to convey signals from a rotating system to a stationary system. The blade proximity monitor 508 receives an output signal from the second antenna 502U and the magnitude of the excitation signal from the output level monitor 506. Output signal from the second antenna 502U may be amplified. The blade proximity monitor 508 also receives a RPM signal of the main rotor assembly 18 from a contactor 510. Based on the magnitude of the excitation signal applied to the first antenna 502L and the magnitude of the output signal from the second antenna 502U, blade proximity monitor 508 can detect the distance between the first antenna 502L and the second antenna 502U. This provides an indication of the distance between the rotor blades. The larger the magnitude of the output signal from second antenna 502U, the closer the blades.

The blade proximity monitor 508 may output the measured distance between the blades to a rotor track and balance unit 512. The blade proximity monitor 508 may output the measured distance between the blades to instrument system 514 and to a pilot display 516. If the measured distance goes below a threshold, then an alert may be generated to the pilot that the blades of the upper rotor assembly 32 and the lower rotor assembly 28 are too close to each other.

The use of a dual rotor, main rotor assembly 18 allows improvements in control of main rotor assembly 18. Flight control system 120 may apply different control envelopes to the upper rotor assembly 28 and the lower rotor assembly 32. Flight control system 120 may impose different control ranges the upper rotor assembly 28 and the lower rotor assembly 32 including control elements such as prioritization, gain vs. differential, collective versus cyclic, etc. The upper rotor assembly 28 and the lower rotor assembly 32 may be independently controlled through the use of separate upper and lower swashplates. Alternatively, the upper rotor assembly 28 and the lower rotor assembly 32 may be independently controller using individual blade control (IBC) techniques.

Aircraft 10 employs a fly-by-wire (FBW) control system to reduce pilot work load. In an exemplary embodiment, FCC 124 determines the aircraft airspeed based on one or more sensors 122. The FCC 124 then adjusts the collective pitch of the upper rotor assembly 28 and/or the lower rotor assembly 32 in response to the airspeed. FCC 124 may use a look up table that indexes airspeed to collective pitch. Alternatively, FCC 124 may use an algorithm to compute the collective pitch based on airspeed. As noted above, the collective pitch of upper rotor assembly 28 and the lower rotor assembly 32 may be the same or different.

Another feature to reduce pilot workload includes automatically adjusting the RPM and/or pitch of propeller 42 in response to a velocity or acceleration command from the pilot. Conventional systems would require the pilot to adjust propeller RPM and/or pitch through individual inputs. The flight control system 120 allows the pilot to enter a desired velocity or an acceleration, and the FCC 124 generates the proper commands to the translational thrust interface 130 to establish an RPM and/or pitch to meet the desired velocity or acceleration.

In exemplary embodiments, the flight control system 120 controls the main rotor assembly 18 to prevent the tips of rotor blades 36 from exceeding a threshold speed. In exemplary embodiments, the threshold speed may be 0.9 Mach 1. This threshold would prevent the rotor blade tips from exceeding the speed of sound. The threshold speed may vary, and may be set to limit drag on the rotor blades to below a certain level. In one embodiment, the FCC 124 determines air temperature from sensors 122. FCC 124 may also determine prevailing wind speed and direction from sensors 122. The FCC 124 then computes the threshold speed based on the speed of sound (e.g., Mach 1) at the sensed air temperature. The FCC 124 may set the threshold to 0.9 Mach 1, for example. FCC 124 then controls RPM of the main rotor assembly 18 to prevent the rotor blade tips from exceeding the threshold. In an exemplary embodiment, the FCC maintain 85% of the nominal rotor RPM. FCC 124 may take into account prevailing wind direction and speed in controlling the RPM of the main rotor assembly 18. The 0.9 Mach 1 threshold is only one example, and other speed thresholds may be employed to achieve desired results (e.g., reduce drag).

In exemplary embodiments, active elevator 43 is configured and controlled to improve stability be compensating for forces such as propeller torque and/or rotor downwash. Elevator 43 includes a left elevator and a right elevator on opposite sides of the axis of rotation of the propeller 42. The left elevator and right elevator may be independently controlled to assume different positions. The tail fairing interface 132 is configured to receive commands from the FCC 124 to control one or more actuators, such as a mechanical-hydraulic or electric actuators, to position the left elevator and right elevator independently. This independent control of the left elevator and right elevator aids in compensating propeller torque and/or rotor downwash.

The left elevator and right elevator may also have different physical configurations to compensate for compensating propeller torque and/or rotor downwash. The left elevator and right elevator may be offset relative to each other along the longitudinal and/or lateral axes of aircraft 10. Further, the left elevator and right elevator may have different geometries where one of the left elevator and right elevator is larger than then other along the longitudinal and/or lateral axes of aircraft 10. The left elevator and right elevator may have differing aerodynamic surfaces (e.g., airfoils) as well.

The cockpit of aircraft includes a single, semi-active, collective input (e.g., stick) positioned between the two pilot seats.

Figure 8:
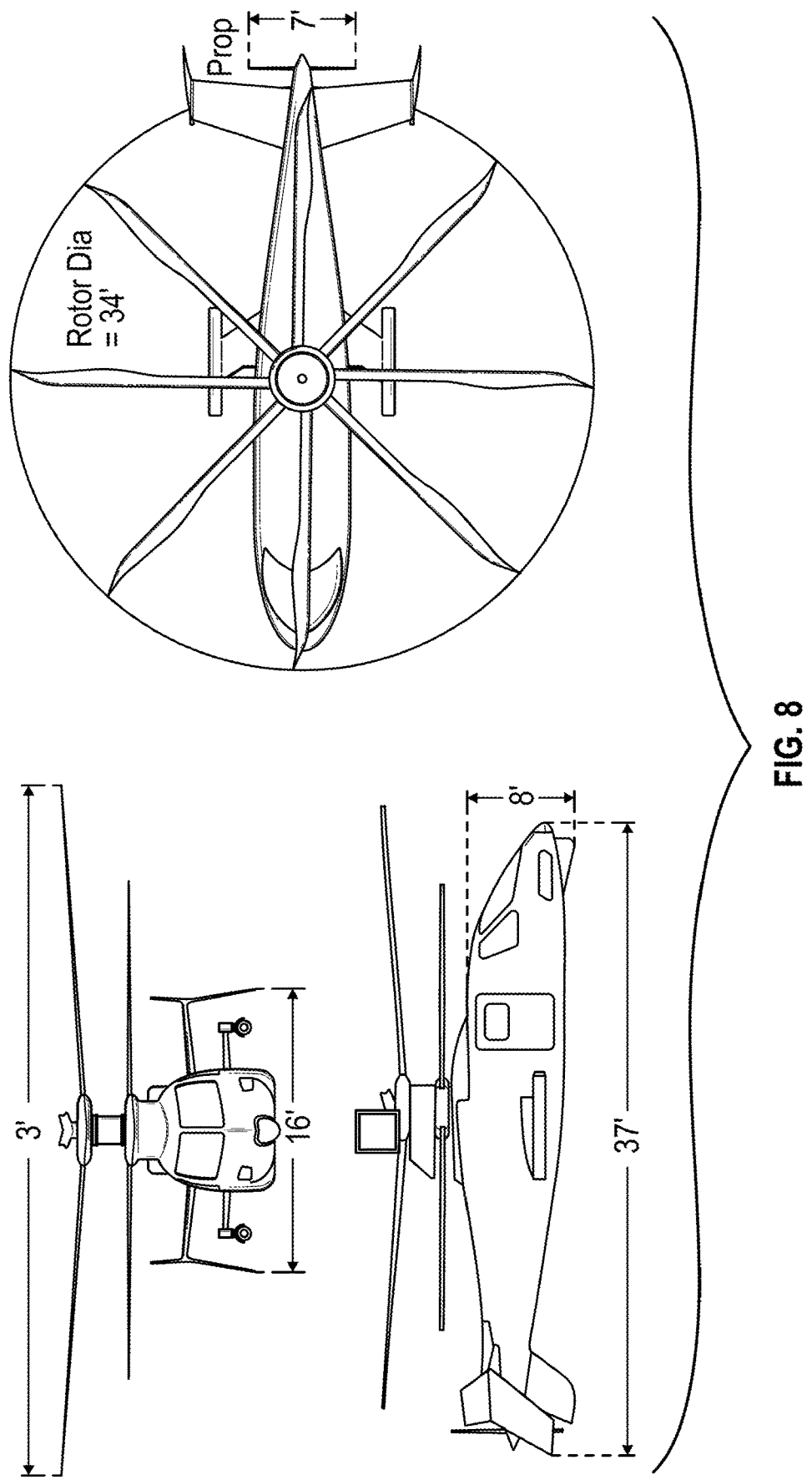
FIG. 8 depicts front, side and top views of an aircraft in an exemplary embodiment.

Exemplary embodiments of aircraft 10 provide a much smaller footprint than existing aircraft. This makes aircraft 10 well suited for missions in confined terrain, urban settings, and shipboard operations. FIG. 8 presents front, side and top views of an exemplary aircraft. One feature contributing to the reduced footprint is the location of the main rotor shaft relative to the airframe 12. As shown in FIG. 1, the axis of rotation A, of the main rotor assembly 18, intersects longitudinal axis, L, along a span of axis L, extending from the nose of the aircraft to the tip of the hub of propeller 42. In an exemplary embodiment, the axis of rotation A is located at about a 44% station (STA) of the fuselage or airframe 12.

In an exemplary embodiment, there is about 5.2 inches from the main rotor pylon to the blade hub centerline. In an exemplary embodiment, there is about 0.7 inch hub clearance to the main rotor pylon. In an exemplary embodiment, the rotor blades 36 extend beyond the nose of the aircraft by at least about 13 inches (0.33 meters). In an exemplary embodiment, rotor blades 36 extend beyond the nose of the aircraft by about 6.9% of the blade span, which may be about 14 inches.

The use of a rigid rotor system, along with the rotor shaft position (e.g., axis A) allows for much easier air-to-air refueling. The stiff rotor blades 36 ease air-to-air refueling by reducing blade flapping, which may result in a blade contacting a tanker fuel line during refueling.

Aircraft 10 provides an improved glide slope angle of about 5-to-1 to about or 6-to-1. This is due to the propeller 42 taking energy out of the airstream, inputting energy into the gear box 26 to increase the speed of the main rotor assembly 18 during autorotation. As shown in FIGS. 3 and 4, the main gear box 26 interconnects the main rotor assembly 18 and propeller 42. During autorotation, airflow rotates propeller 42, which will subsequently rotate the main rotor assembly 18 and thus increase lift. Propeller 42 also helps stabilize aircraft 10 during decent by acting like a parachute and a rudder, both slowing aircraft 10 and helping to direct aircraft 10 to maintain control. The ability to fly aircraft 10 in a nose down attitude also improves glide slop angle.

In an exemplary embodiment, the distance between the hub of the upper rotor assembly 28 and the hub of the lower rotor assembly 32 ranges from about 2 feet to about 2.5 feet. In another exemplary embodiment, the distance between the hub of the upper rotor assembly 28 and the hub of the lower rotor assembly 32 ranges from about 2.1 feet to about 2.4 feet. In another exemplary embodiment, the distance between the hub of the upper rotor assembly 28 and the hub of the lower rotor assembly 32 is about 2.29 feet. In another exemplary embodiment, the distance between a midpoint of a blade in the upper rotor assembly 28 and a midpoint of a blade in the lower rotor assembly 32 is about 29.0 inches. In another exemplary embodiment, the distance between a tip of a blade in the upper rotor assembly 28 and a tip of a blade in the lower rotor assembly 32 is about 31.0 inches. In another exemplary embodiment, the distance between the hub of the upper rotor assembly 28 and the hub of the lower rotor assembly 32 is about 14% of the blade span, which may be about 188 inches.

Figure 12:
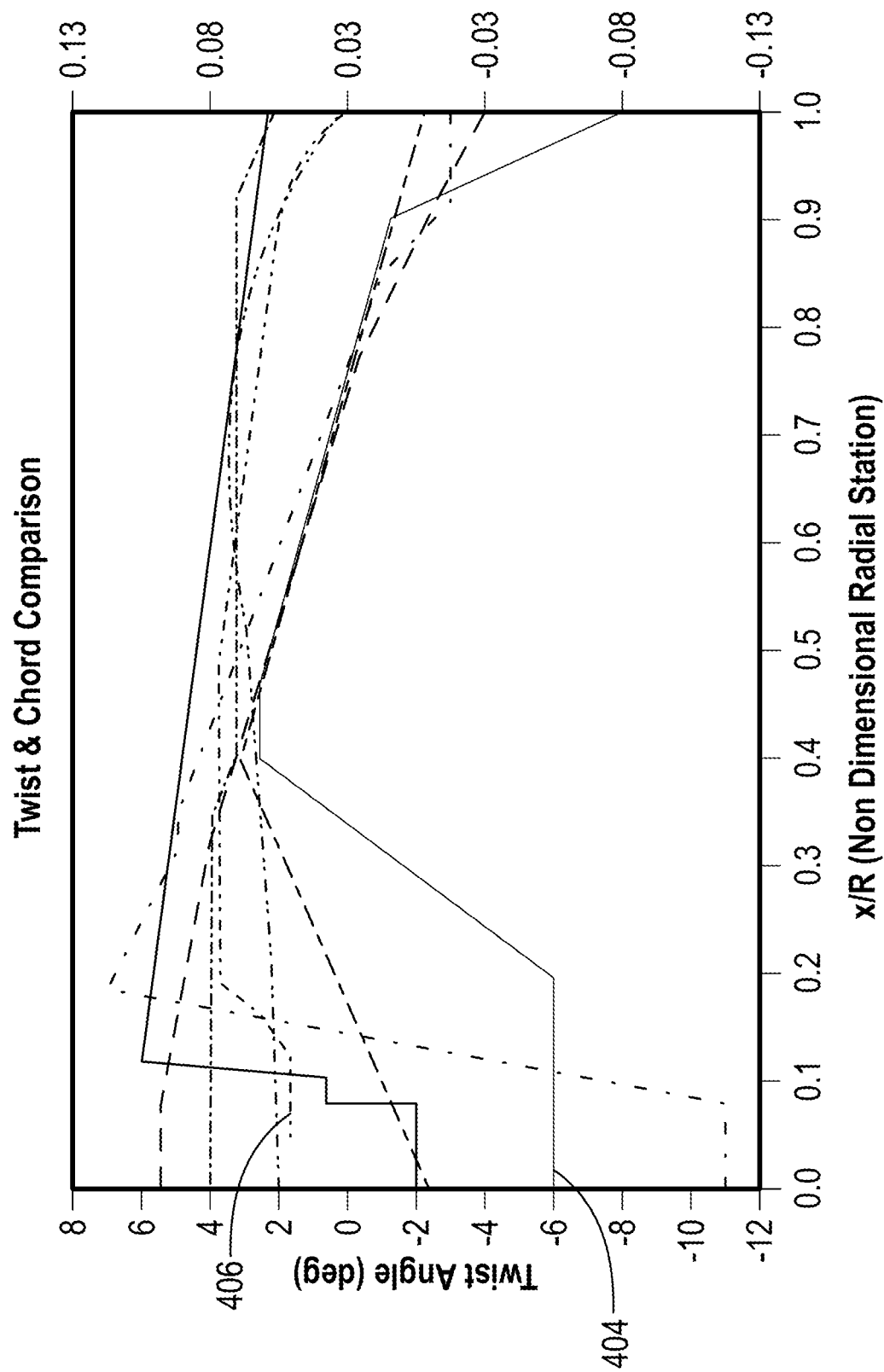
FIG. 12 is a graph illustrating the twist angle and the chord to radius ratio over a span of a main rotor blade.

With reference again to FIG. 2A and FIG. 12, the main rotor blades 36 of the upper and lower rotor assembly 28, 32 include several geometric characteristics including blade planform (chord), thickness, airfoil, and twist distributions. The design of each of the blades 36 is an outcome of optimizing rotor performance and high speed flight efficiency, while satisfying structural requirements throughout an anticipated flight envelope of the aircraft. Main considerations of the blade design include: a) minimizing advancing side compressibility effects (drag), b) reducing retreating side blade drag, c) designing the rotor with sufficient blade area (solidity), d) maintaining aeroelastic stability and e) maintaining blade tip separations between the upper and lower rotors.

Advancing side compressibility effects are minimized through the selection of airfoils, thickness distribution, twist, blade sweep and rotor speed scheduling with flight velocity. Retreating side blade drag in reversed flow is minimized by the redistribution of blade chord from inboard regions to outer spanwise locations, twist tailoring and incorporating particular airfoils designed to minimize drag under reversed flow conditions. Blade area (rotor solidity) maximizes operating design point performance efficiency while maintaining sufficient maneuver margin. The design parameters are defined to ensure that blade aeroelastic and tip clearance requirements are satisfied as ascertained from independent structural-dynamic and aeroelastic analyses, along with bearing design manufacturing considerations.

The plan view of a rotor blade illustrated in FIG. 2A shows the basic chord distribution and the distribution of the blade area relative to the blade span. The rotor blade 36 can generally be divided into a root region, an inboard region, a main region, and a blade tip region. The root, inboard, main, and tip regions define the span of the rotor blade 36 and define a blade radius R between the axis of rotation of the rotor shafts 46, 50 and a distal tip end 150 of the blade tip region. The rotor blade 36 defines a leading edge 152 and a trailing edge 154, which define the chord C of the rotor blade 36. A pitching or feathering axis P is the axis about which aerodynamic twist of the blade 36 primarily occurs.

The blade 36 illustrated and described herein distributes blade chord, twist, taper, sweep, airfoil shape, thickness/chord and chordwise position relative to the feathering axis P to achieve balanced high speed forward flight and hover relative to both efficiency and high thrust capability. The blade region extending inboard of approximately 20% R defines the root region and includes the hub to blade attachment system. The rotor blade 36 is mounted along the root region so that the root region has comparatively minimal aerodynamic significance since it is typically at least partially enclosed within a blade cuff (not shown).

In the illustrated, non-limiting embodiment, the inboard region extends between about 20% R and about 40% R. The configuration of the inboard region of the rotor blade 36 may be determined primarily based on adjacent structural limitations. In one embodiment, the main region extends from about 40% R to about 90% R, and the tip region extends from about 90% R to about 100% R. The main region and the tip region are the primary aerodynamic portions of the blade 36. The tip region may be defined by several design characteristics that differentiate it from the main region, such as for example, changes in twist. and the incorporation of other geometric characteristics such as sweep, dihedral, and anhedral. In one embodiment, illustrated in FIG. 13c, the tip region includes an aft tip sweep of about 25° to reduce a local Mach number of the blade, thereby minimizing compressibility drag. In addition, the tip region may include taper as described in U.S. Pat. No. 7,513,750, incorporated herein by reference, to provide improved hover capability.

With reference to FIGS. 12 and 13a-d, the blade 36 has a unique shape in which the blade chord is maximized within the inboard region, gradually decreases over the main region, and reaches a minimum in the tip region. In one embodiment, the chord to radius ratio within the root region gradually increases adjacent the inboard region from about 0.04 to about 0.08. The inboard region has a generally constant chord to radius ratio of about 0.08. The chord to radius ratio gradually decreases within the main region from about 0.08 to about 0.05 and then decreases more sharply within the tip region from about 0.05 to about 0.03.

The airfoil distribution along the blade span is configured to vary between the root region, the inboard region, the main region, and the tip region. In one embodiment, the airfoil distribution adjacent the rotor includes a generally circular cylinder as a result of structural and fairing requirements. When moving towards the outboard end 150 of the blade 36, the airfoil distribution is configured to transition to a cambered ellipse. The main region of the blade 36 may include a thick, conventional airfoil having sharp trailing edges as described in U.S. Pat. No. 7,854,593, which is incorporated herein by reference. With reference to FIG. 13d, the thickness to chord ratio of the rotor blade 36 is greatest at the root region, and gradually decreases over the inboard region and the main region from about 0.35 to about 0.1, where the thickness to chord ratio remains constant over the tip region.

Figure 13A:
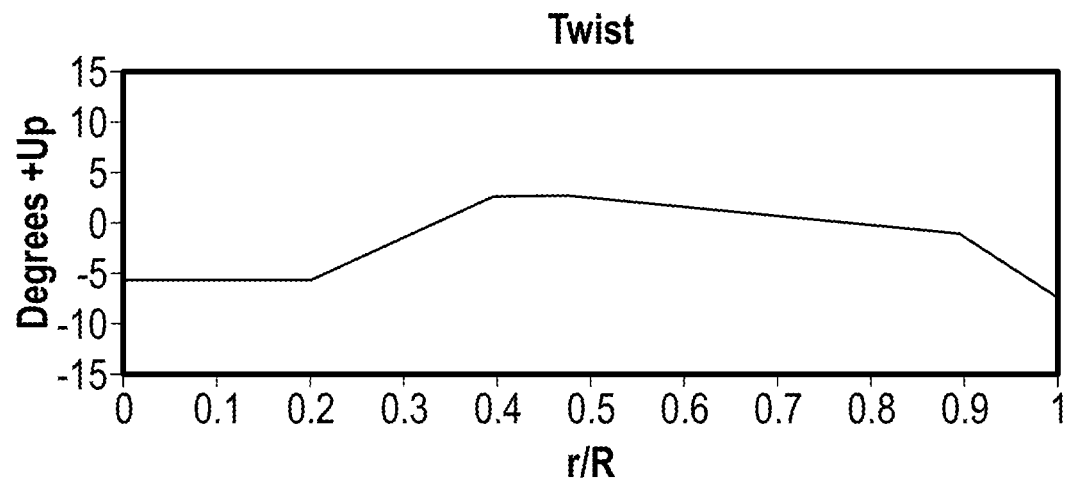
FIGS. 13a-13d are graphs illustrated the chord, twist, sweep and thickness over a span of a main rotor blade.
Figure 13B:
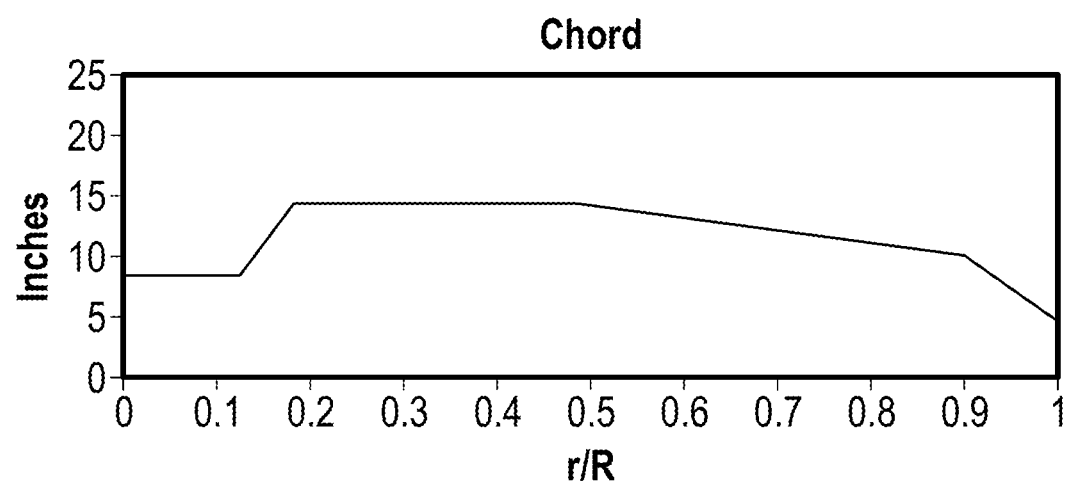
Figure 13C:
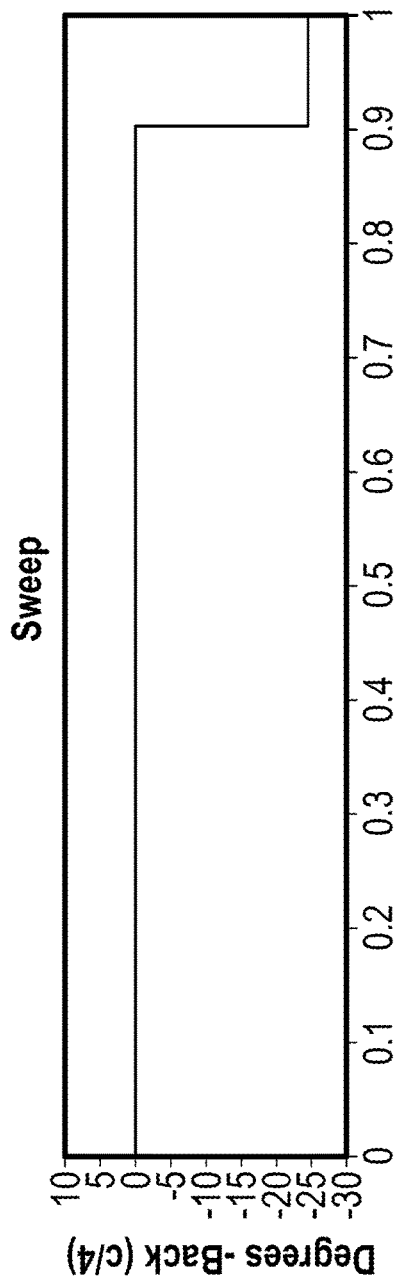
Figure 13D:
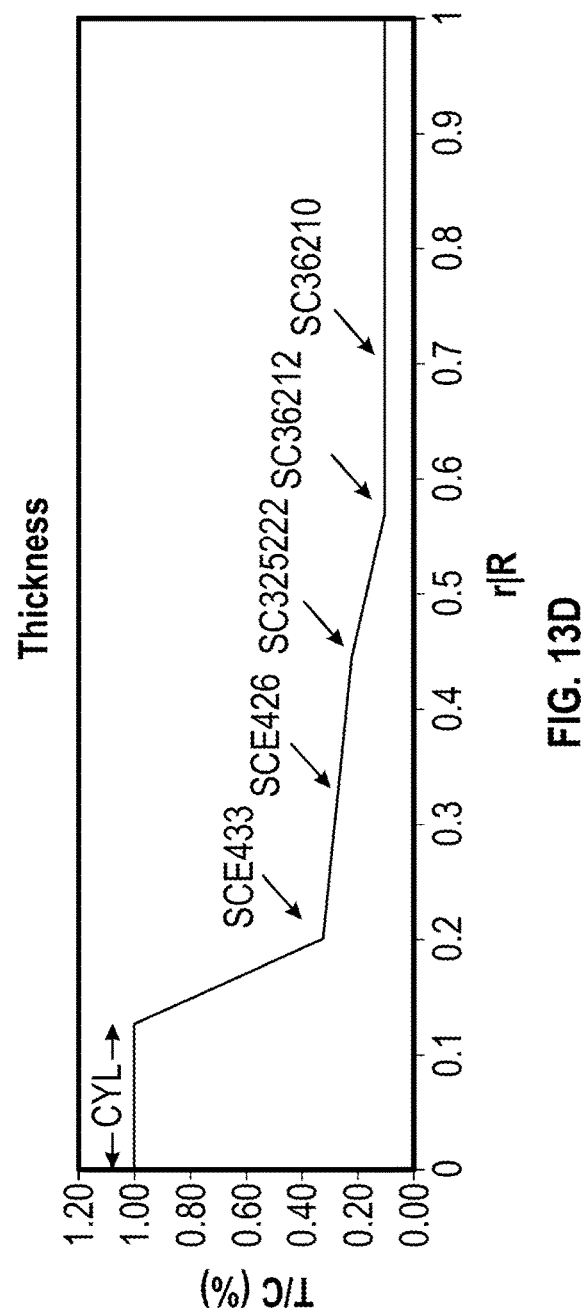

Another characteristic of the rotor blade 36 is blade twist distribution (see FIG. 13a). The rotor blade 36 preferably incorporates an unconventional combination of positive and negative twist gradients. In the illustrated, non-limiting embodiment, the root region includes a generally constant twist angle of about −6°. The twist over the inboard region may vary positively between about −6° and about 3° at a constant, or alternatively, a non-constant rate. The main region of the rotor blade 36 has a twist distribution varying between about 3° to about −1° and the tip region has a varying twist extending between about −1° and −8°. This large negative twist rate formed at the tip region is configured to reduce the tip drag associated with high angle of attack experienced by coaxial lift-offset rotors in hover.

Data supporting graphs illustrated in FIGS. 13a-13d is shown below in Tables 1:

TABLE 1

| Program | S-97 |
|---|---|
| Configuration No./Designation | Raider ™ |
| Date | Jan. 15, 2013 |
| Hover Vtip (ft/s) | 675 |
| Lateral Lift Offset Limit | −0.28 |
| Advancing Tip Mach Number Limit | 0.90 |
| Root cutout (r/R) | 0.126 |
| Pre-cone: Upper Rotor (+up) | 3 |
| Pre-cone: Lower Rotor (+up) | 2 |
| Total Rotor separation distance (d) | 0.1347 |
| Number of blades per rotor | 4 |
| Radius (ft) | 17 |
| Thrust-weighted solidity (per rotor) | 0.07072 |
| Thrust-weighted solidity (total) | 0.14143 |

TABLE 3

| Sweep | |
|---|---|
| r/R | deg |
| 0 | 0 |
| 0.5 | 0 |
| 0.9 | 0 |
| 0.9 | −25 |
| 1 | −25 |

TABLE 2

Chord

| r/R | chord (m) | chord (in) |
|---|---|---|
| 0 | 0.2286 | 9.00 |
| 0.126 | 0.2286 | 9.00 |
| 0.15 | 0.26406 | 10.40 |
| 0.19 | 0.37196 | 14.64 |
| 0.2 | 0.37854 | 14.90 |
| 0.21 | 0.37854 | 14.90 |
| 0.25 | 0.37854 | 14.90 |
| 0.3 | 0.37854 | 14.90 |
| 0.32 | 0.37854 | 14.90 |
| 0.35 | 0.37854 | 14.90 |
| 0.39 | 0.37854 | 14.90 |
| 0.4 | 0.37854 | 14.90 |
| 0.41 | 0.37854 | 14.90 |
| 0.446 | 0.37854 | 14.90 |
| 0.45 | 0.3785 | 14.90 |
| 0.46 | 0.3776 | 14.87 |
| 0.47 | 0.3761 | 14.81 |
| 0.5 | 0.3690 | 14.53 |
| 0.55 | 0.3548 | 13.97 |
| 0.57 | 0.3496 | 13.76 |
| 0.6 | 0.3426 | 13.49 |
| 0.65 | 0.3309 | 13.03 |
| 0.7 | 0.3192 | 12.57 |
| 0.75 | 0.3075 | 12.11 |
| 0.8 | 0.2958 | 11.64 |
| 0.85 | 0.2841 | 11.18 |
| 0.89 | 0.2747 | 10.81 |
| 0.9 | 0.2693 | 10.60 |
| 0.91 | 0.2580 | 10.16 |
| 0.95 | 0.2009 | 7.91 |
| 0.995 | 0.1366 | 5.38 |
| 1 | 0.12941 | 5.09 |

TABLE 4

Twist

| r/R | theta |
|---|---|
| 0 | −6 |
| 0.126 | −6 |
| 0.15 | −6 |
| 0.19 | −6 |
| 0.2 | −5.89 |
| 0.21 | −5.57 |
| 0.25 | −3.85 |
| 0.3 | −1.69 |
| 0.32 | −0.83 |
| 0.35 | 0.46 |
| 0.39 | 2.18 |
| 0.4 | 2.5 |
| 0.41 | 2.61 |
| 0.446 | 2.61 |
| 0.45 | 2.61 |
| 0.46 | 2.59 |
| 0.47 | 2.52 |
| 0.5 | 2.25 |
| 0.55 | 1.8 |
| 0.57 | 1.62 |
| 0.6 | 1.35 |
| 0.65 | 0.9 |
| 0.7 | 0.45 |
| 0.75 | 0 |
| 0.8 | −0.45 |
| 0.85 | −0.9 |
| 0.89 | −1.26 |
| 0.9 | −1.49 |
| 0.91 | −2.02 |
| 0.95 | −4.67 |
| 0.995 | −7.67 |
| 1 | −8 |

TABLE 5

Thickness

| r/R | AF | t/c (%) |
|---|---|---|
| 0 | CYL | 1 |
| 0.1262 | CYL | 1 |
| 0.2 | SCE433 | 0.33 |
| 0.32 | SCE426 | 0.26 |
| 0.446 | SC325222 | 0.22 |
| 0.57 | SC36212 | 0.12 |
| 0.7 | SC36210 | 0.1 |
| 0.8 | SC36210 | 0.1 |
| 0.85 | SC36210 | 0.1 |
| 0.9 | SC36210 | 0.1 |
| 0.95 | SC36210 | 0.1 |
| 1 | SC36210 | 0.1 |

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiment of the invention have been described, it is to be understood that aspects of the invention may include only some of the described embodiments. Accordingly, the invention is not to be seen as limited by the foregoing description.

What is claimed is:

1. A coaxial counter-rotating main rotor blade assembly for a rotary wing aircraft having an upper rotor assembly and a lower rotor assembly rotatable about a common rotor axis, each of the upper rotor assembly and the lower rotor assembly including a plurality of rotor blades, each of the plurality of rotor blades, comprising:
   a main rotor blade root region;
   a main rotor blade inboard region arranged outboard of said main rotor blade root region;
   a main rotor blade main region arranged outboard of said main rotor blade inboard region; and
   a main rotor blade tip region arranged outboard of said main rotor blade main region, wherein a blade chord to blade radius ratio within the root region increases adjacent the inboard region from about 0.04 to about 0.08, a blade chord to blade radius ratio of the inboard region includes a substantially constant blade chord to blade radius ratio of about 0.08, a blade chord to blade radius ratio of the main region decreases from about 0.08 to about 0.05, and a blade chord to blade radius ratio in the tip region decreases from about 0.05 to about 0.03 in order to achieve balanced high speed forward flight and hover relative to both efficiency and high thrust capability and such optimization is for use both in the upper rotor assembly and in the lower rotor assembly.

2. The coaxial counter-rotating main rotor blade assembly according to claim 1, wherein the main rotor blade root region extends from about 0% R to 20% R, the main rotor blade inboard region extends from about 20% R to 40% R, the main rotor blade main region extends from about 40% R to 90% R, and the main rotor blade tip region extends from about 90% R to 100% R.

3. The coaxial counter-rotating main rotor blade assembly according to claim 2, wherein the main rotor blade tip region has a large negative twist angle extending between about −1° and −8°.

4. The coaxial counter-rotating main rotor blade assembly according to claim 2, wherein the main rotor blade main region has a twist angle extending between about 3° and about −1°.

5. The coaxial counter-rotating main rotor blade assembly according to claim 2, wherein the twist angle of a portion of the main rotor blade main region varies at a constant rate.

6. The coaxial counter-rotating main rotor blade assembly according to claim 2, wherein the main rotor blade inboard region has a twist angle extending between about −6° and about 3°.

7. The coaxial counter-rotating main rotor blade assembly according to claim 2, wherein the twist angle of the main rotor blade inboard region varies at a constant rate.

8. The coaxial counter-rotating main rotor blade assembly according to claim 2, wherein the main rotor blade root region has a constant twist angle.

9. The coaxial counter-rotating main rotor blade assembly according to claim 2, wherein the main rotor blade root region has a twist angle of about −6°.

10. The coaxial counter-rotating main rotor blade assembly according to claim 2, wherein the main rotor blade tip region has an aft tip sweep of about 25°.

11. The coaxial counter-rotating main rotor blade assembly according to claim 2, wherein a thickness to chord ratio of the rotor blade gradually decreases between the inboard region and the tip region from about .035 to about .01.

12. The coaxial counter-rotating main rotor blade assembly according to claim 1, wherein at least one of sweep, chord, twist, and thickness to chord ratio of the rotor blade is defined in any of the following tables:

TABLE 1

| Program | S-97 |
|---|---|
| Configuration No./Designation | Raider ™ |
| Date | Jan. 15, 2013 |
| Hover Vtip (ft/s) | 675 |
| Lateral Lift Offset Limit | −0.28 |
| Advancing Tip Mach Number Limit | 0.90 |
| Root cutout (r/R) | 0.126 |
| Pre-cone: Upper Rotor (+up) | 3 |
| Pre-cone: Lower Rotor (+up) | 2 |
| Total Rotor separation distance (d) | 0.1347 |
| Number of blades per rotor | 4 |
| Radius (ft) | 17 |
| Thrust-weighted solidity (per rotor) | 0.07072 |
| Thrust-weighted solidity (total) | 0.14143 |

| Thickness | | |
|---|---|---|
| r/R | AF | t/c (%) |
| 0 | CYL | 1 |
| 0.1262 | CYL | 1 |
| 0.2 | SCE433 | 0.33 |
| 0.32 | SCE426 | 0.26 |
| 0.446 | SC325222 | 0.22 |
| 0.57 | SC36212 | 0.12 |
| 0.7 | SC36210 | 0.1 |
| 0.8 | SC36210 | 0.1 |
| 0.85 | SC36210 | 0.1 |
| 0.9 | SC36210 | 0.1 |
| 0.95 | SC36210 | 0.1 |
| 1 | SC36210 | 0.1 |

| Chord | | |
|---|---|---|
| r/R | chord (m) | chord (in) |
| 0 | 0.2286 | 9.00 |
| 0.126 | 0.2286 | 9.00 |
| 0.15 | 0.26406 | 10.40 |
| 0.19 | 0.37196 | 14.64 |
| 0.2 | 0.37854 | 14.90 |
| 0.21 | 0.37854 | 14.90 |
| 0.25 | 0.37854 | 14.90 |
| 0.3 | 0.37854 | 14.90 |
| 0.32 | 0.37854 | 14.90 |
| 0.35 | 0.37854 | 14.90 |
| 0.39 | 0.37854 | 14.90 |
| 0.4 | 0.37854 | 14.90 |
| 0.41 | 0.37854 | 14.90 |
| 0.446 | 0.37854 | 14.90 |
| 0.45 | 0.3785 | 14.90 |
| 0.46 | 0.3776 | 14.87 |
| 0.47 | 0.3761 | 14.81 |
| 0.5 | 0.3690 | 14.53 |
| 0.55 | 0.3548 | 13.97 |
| 0.57 | 0.3496 | 13.76 |
| 0.6 | 0.3426 | 13.49 |
| 0.65 | 0.3309 | 13.03 |
| 0.7 | 0.3192 | 12.57 |
| 0.75 | 0.3075 | 12.11 |
| 0.8 | 0.2958 | 11.64 |
| 0.85 | 0.2841 | 11.18 |
| 0.89 | 0.2747 | 10.81 |
| 0.9 | 0.2693 | 10.60 |
| 0.91 | 0.2580 | 10.16 |
| 0.95 | 0.2009 | 7.91 |
| 0.995 | 0.1366 | 5.38 |
| 1 | 0.12941 | 5.09 |

| Sweep | |
|---|---|
| r/R | deg |
| 0 | 0 |
| 0.5 | 0 |
| 0.9 | 0 |
| 0.9 | −25 |
| 1 | −25 |

| Twist | |
|---|---|
| r/R | theta |
| 0 | −6 |
| 0.126 | −6 |
| 0.15 | −6 |
| 0.19 | −6 |
| 0.2 | −5.89 |
| 0.21 | −5.57 |
| 0.25 | −3.85 |
| 0.3 | −1.69 |
| 0.32 | −0.83 |
| 0.35 | 0.46 |
| 0.39 | 2.18 |
| 0.4 | 2.5 |
| 0.41 | 2.61 |
| 0.446 | 2.61 |
| 0.45 | 2.61 |
| 0.46 | 2.59 |
| 0.47 | 2.52 |
| 0.5 | 2.25 |
| 0.55 | 1.8 |
| 0.57 | 1.62 |
| 0.6 | 1.35 |
| 0.65 | 0.9 |
| 0.7 | 0.45 |

-continued

| Twist | |
|---|---|
| r/R | theta |
| 0.75 | 0 |
| 0.8 | −0.45 |
| 0.85 | −0.9 |
| 0.89 | −1.26 |
| 0.9 | −1.49 |
| 0.91 | −2.02 |
| 0.95 | −4.67 |
| 0.995 | −7.67 |
| 1 | −8. |

\* \* \* \* \*